United States Patent
Yakura et al.

(10) Patent No.: US 12,256,154 B2
(45) Date of Patent: Mar. 18, 2025

(54) ELECTRONIC DEVICE AND IMAGING DEVICE WITH IMAGE DATA CORRECTION

(71) Applicant: Sony Semiconductor Solutions Corporation, Kanagawa (JP)

(72) Inventors: Yuji Yakura, Kanagawa (JP); Masashi Nakata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 219 days.

(21) Appl. No.: 17/911,944

(22) PCT Filed: Mar. 9, 2021

(86) PCT No.: PCT/JP2021/009377
§ 371 (c)(1),
(2) Date: Sep. 15, 2022

(87) PCT Pub. No.: WO2021/225030
PCT Pub. Date: Nov. 11, 2021

(65) Prior Publication Data
US 2023/0142989 A1    May 11, 2023

(30) Foreign Application Priority Data
May 8, 2020    (JP) .................. 2020-082601

(51) Int. Cl.
*H04N 23/81*    (2023.01)
*H04N 23/11*    (2023.01)
(Continued)

(52) U.S. Cl.
CPC ............. *H04N 23/81* (2023.01); *H04N 23/11* (2023.01); *H04N 23/45* (2023.01); *H04N 23/56* (2023.01)

(58) Field of Classification Search
CPC ........ H04N 23/81; H04N 23/11; H04N 23/45; H04N 23/56; H04N 7/144; H04N 23/13;
(Continued)

(56) References Cited

U.S. PATENT DOCUMENTS 9,436,870 B1 *    9/2016    Mangiat .............. G06V 40/161
9,635,330 B2 *    4/2017    Ebi ........................ H04N 9/646
(Continued)

FOREIGN PATENT DOCUMENTS

CN    1794783 A    6/2006
CN    102411878 A    4/2012
(Continued)

OTHER PUBLICATIONS

International Search Report (PCT/ISA/210), International Application No. PCT/JP2021/009377, dated Jun. 1, 2021.
(Continued)

*Primary Examiner* — Chiawei Chen
(74) *Attorney, Agent, or Firm* — Michael Best & Friedrich LLP

(57) ABSTRACT

Even in a case where the amount of incident light is small, a high-Quality captured image can be obtained.
An electronic device includes: a display unit; a first imaging unit that is disposed on a side opposite to a display surface of the display unit and is capable of capturing an image of light in an infrared light wavelength band that has passed through the display unit; a second imaging unit that is disposed on a side opposite to the display surface of the display unit and is capable of capturing as image of light in a visible light wavelength band that has passed through the display unit; and a correction unit that corrects image data imaged by the second imaging unit on the basis of image data imaged by the first imaging unit.

20 Claims, 18 Drawing Sheets

(51) Int. Cl.
*H04N 23/45* (2023.01)
*H04N 23/56* (2023.01)

(58) Field of Classification Search
CPC .... H04N 23/617; H04N 23/741; H04N 23/90; H04N 23/95; H04N 23/951; G03B 29/00; G03B 42/00; G03B 15/00; H04M 1/0266; H04M 2250/52; H04M 1/0264; H04M 1/72403; G06F 1/1686; G06F 1/1626; G06F 1/1637; G06F 1/1684
See application file for complete search history.

(56) References Cited

U.S. PATENT DOCUMENTS

| | | | | |
|---|---|---|---|---|
| 10,609,313 | B2* | 3/2020 | Saragaglia | H04N 23/20 |
| 10,775,741 | B2* | 9/2020 | Jepsen | G03H 1/0808 |
| 11,516,389 | B2* | 11/2022 | Wu | H04N 23/11 |
| 2004/0075742 | A1* | 4/2004 | Mekata | G01J 5/0022 |
| | | | | 348/E5.081 |
| 2006/0132642 | A1* | 6/2006 | Hosaka | H04N 23/80 |
| | | | | 348/370 |
| 2007/0132864 | A1* | 6/2007 | Tsuruoka | H04N 25/134 |
| | | | | 348/E5.079 |
| 2008/0106591 | A1 | 5/2008 | Border | |
| 2008/0117325 | A1* | 5/2008 | Nakagawa | G03B 13/36 |
| | | | | 348/345 |
| 2010/0102366 | A1* | 4/2010 | Lee | H04N 25/705 |
| | | | | 257/E31.073 |
| 2014/0340515 | A1* | 11/2014 | Tanaka | H04N 7/18 |
| | | | | 382/199 |
| 2016/0254300 | A1* | 9/2016 | Wajs | H04N 25/135 |
| | | | | 257/435 |
| 2017/0084231 | A1 | 3/2017 | Chew | |
| 2018/0069060 | A1 | 3/2018 | Rappoport | |
| 2018/0144443 | A1* | 5/2018 | Tetsuka | G06V 10/758 |
| 2018/0333088 | A1* | 11/2018 | Holz | A61B 5/1032 |
| 2019/0102870 | A1* | 4/2019 | Tokizaki | H04N 23/6811 |
| 2019/0158713 | A1* | 5/2019 | McMillan | H04N 7/142 |
| 2020/0288070 | A1* | 9/2020 | Siala | G01S 17/89 |
| 2020/0389575 | A1* | 12/2020 | Gove | H04N 13/239 |
| 2021/0136282 | A1* | 5/2021 | Wu | H04N 25/17 |
| 2021/0150742 | A1* | 5/2021 | Sato | G01C 3/06 |
| 2021/0176383 | A1* | 6/2021 | Kim | G06V 40/18 |
| 2021/0272302 | A1* | 9/2021 | Yang | H04N 23/56 |
| 2022/0392925 | A1* | 12/2022 | Ishizu | H10B 12/00 |

FOREIGN PATENT DOCUMENTS

| | | |
|---|---|---|
| CN | 104125442 A | 10/2014 |
| JP | 2006180269 A | 7/2006 |
| JP | 2012070356 A | 4/2012 |
| JP | 2020507275 A | 3/2020 |

OTHER PUBLICATIONS

Kumar Wahengbam Kanan et al: "Enhancing scene perception using a multispectral fusion of visible-near-infrared image pair", IET Image Processing, IET, Nov. 14, 2019 (Nov. 14, 2019), pp. 2467-2479, vol. 13, No. 13, UK, XP006084364, ISSN: 1751-9659, DOI: 10.1049/IET-IPR.2018.5812.

Zhuo Shaojie et al.: "Enhancing low light images using near infrared flash images", 2010 17th IEEE International Conference On Image Processing (ICIP 201 0); Sep. 26-29, 2010, pp. 2537-2540, Hong Kong, China, [Online] XP093225797.

* cited by examiner

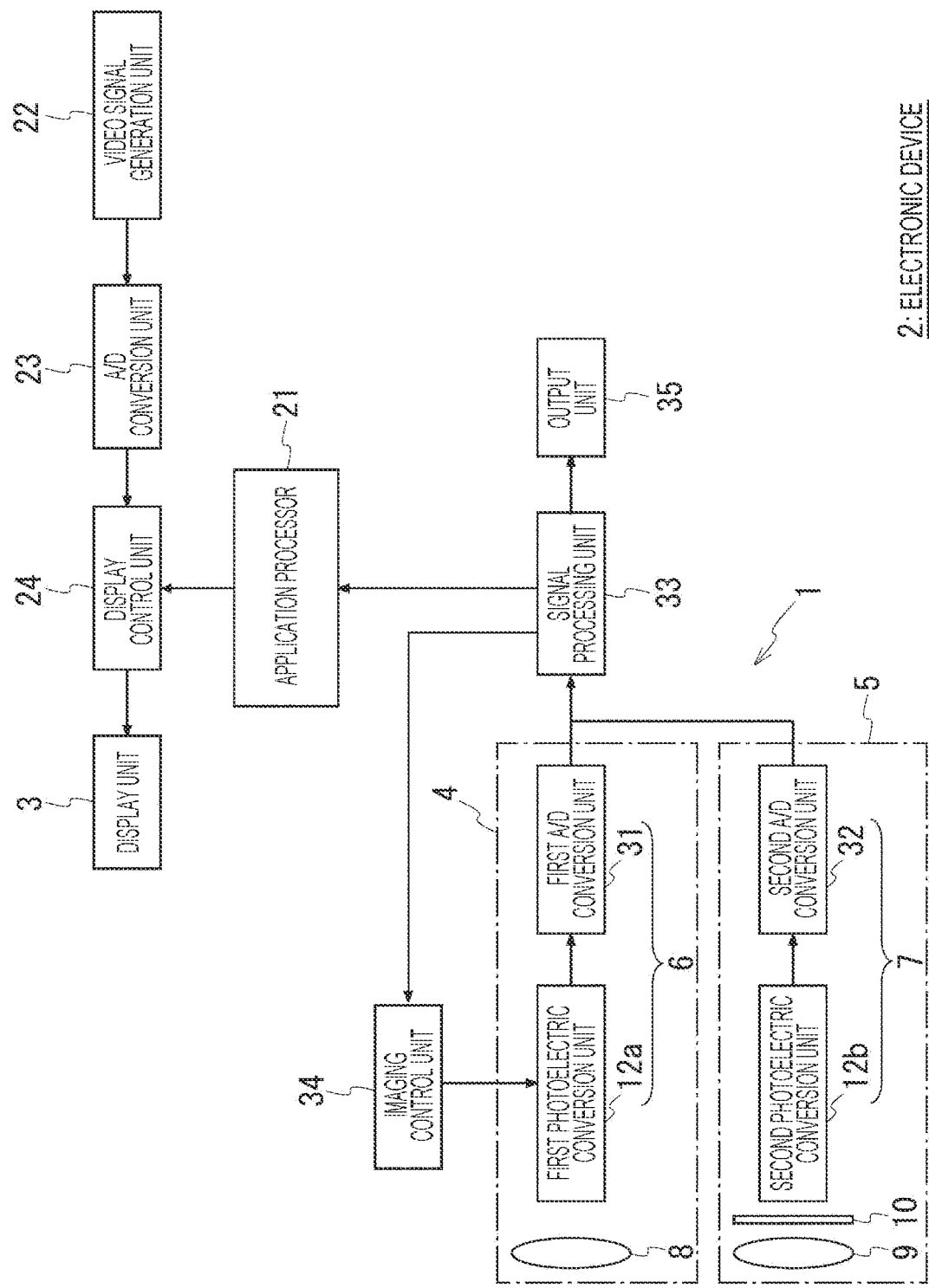

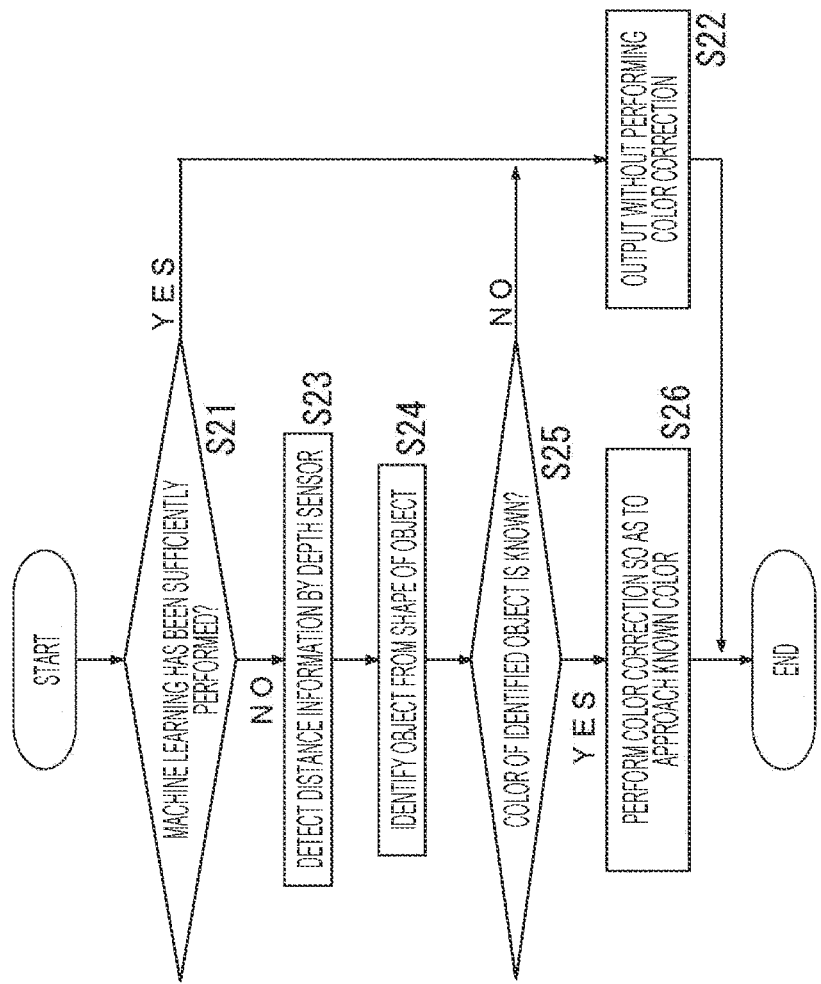

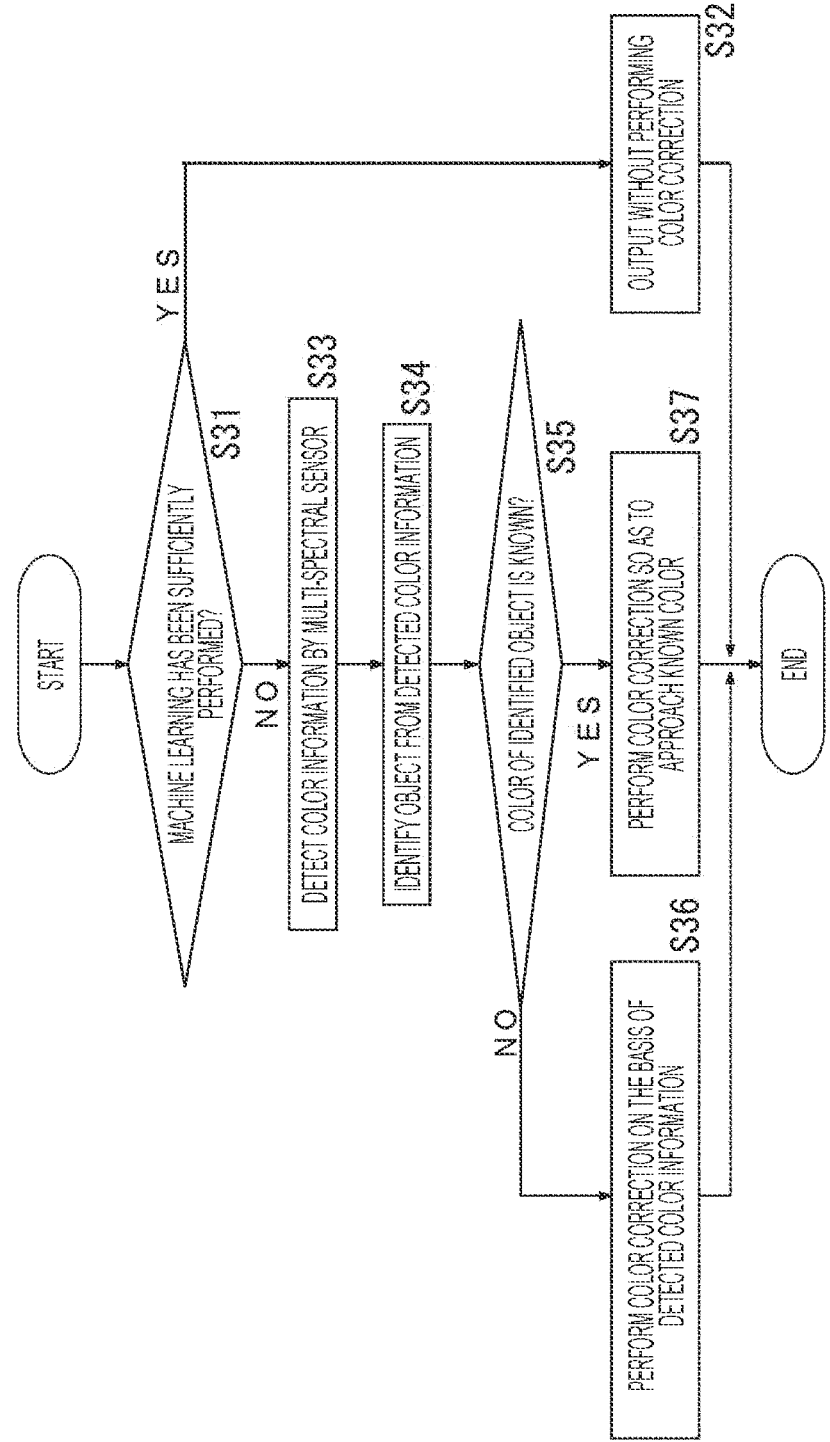

FIG. 10A

| IR | R | | IR | R |
|----|---|---|----|---|
| R | IR | ... | R | IR |
| . | . | . | . | . |
| IR | R | | IR | R |
| R | IR | ... | R | IR |

FIG. 10B

| R | B | | R | B |
|---|---|---|---|---|
| G | IR | ... | G | IR |
| . | . | . | . | . |
| R | B | | R | B |
| G | IR | ... | G | IR |

ELECTRONIC DEVICE AND IMAGING DEVICE WITH IMAGE DATA CORRECTION

TECHNICAL FIELD

The present disclosure relates to an electronic device and an imaging device.

BACKGROUND ART

In recent electronic devices such as smartphones, mobile phones, and personal computers (PCs), various sensors such as cameras are mounted in a frame (bezel) of a display panel. On the other hand, there is a demand for making the outer size of the electronic device as compact as possible without affecting the screen size, and the bezel width tends to be narrowed. In view of such a background, a technique of disposing a camera module immediately below a display panel, and capturing an image of subject light passing through the display panel by the camera module has been proposed.

CITATION LIST

Patent Document

Patent Document 1: US Patent Publication No. 2018/0069060

SUMMARX OF THE INVENTION

Problems to be Solved by the Invention

However, the display panel includes a plurality of layers, and some of the layers have low visible light transmittance. Therefore, when the subject light passing through the display panel is captured by the camera module, the captured image becomes dark or becomes a blurred image as a whole. Furthermore, when the subject light passes through the display panel, there is also a possibility that the image quality of the captured image is deteriorated due to the influence of flare or diffraction.

In addition, in a case where the camera module is disposed on the surface of a small electronic device such as a smartphone, since the lens is thin and the diameter of the lens cannot be increased, the captured image becomes dark and an unclear image is easily obtained under a situation where the surroundings are dark.

The present disclosure provides an electronic device and an imaging device capable of obtaining a high-quality captured image even in a case where the amount of incident light is small.

Solutions to Problems

In order to solve the above problems, according to the present disclosure, there is provided an electronic device including:

a display unit;

a first imaging unit that is disposed on a side opposite to a display surface of the display unit and is capable of capturing an image of light in an infrared light wavelength band that has passed through the display unit;

a second imaging unit that is disposed on a side opposite to the display surface of the display unit and is capable of capturing an image of light in a visible light wavelength band that has passed through the display unit; and a correction unit that corrects image data imaged by the second imaging unit on the basis of image data imaged by the first imaging unit.

The correction unit may correct sensitivity of the image data imaged by the second imaging unit on the basis of the image data imaged by the first imaging unit.

A learning unit that learns a correlation between sensitivity of the image data imaged by the first imaging unit and sensitivity of the image data imaged by the second imaging unit may be provided, and the correction unit may correct the sensitivity of the image data imaged by the second imaging unit on the basis of the image data imaged by the first imaging unit with reference to a learning result in the learning unit.

The correction unit may correct resolution of the image data imaged by the second imaging unit on the basis of the image data imaged by the first imaging unit.

A learning unit that learns a correlation between resolution of image data imaged by the first imaging unit and resolution of image data imaged by the second imaging unit may be provided, and the correction unit may correct the resolution of the image data imaged by the second imaging unit on the basis of the image data imaged by the first imaging unit with reference to a learning result in the learning unit.

The correction unit may correct at least one of a flare component or a diffracted light component included in the image data imaged by the second imaging unit on the basis of the image data imaged by the first imaging unit.

A learning unit that learns a correlation between at least one of a flare component or a diffracted light component included in image data imaged by the first imaging unit and at least one of a flare component or a diffracted light component included in image data imaged by the second imaging unit may be provided, and the correction unit may correct at least one of the flare component or the diffracted light component included in the image data imaged by the second imaging unit on the basis of the image data imaged by the first imaging unit with reference to a learning result in the learning unit.

There may be provided:

a reference determination unit that determines whether or not at least one of sensitivity, resolution, a flare component, or a diffracted light component of the image data imaged by the second imaging unit satisfies a predetermined first reference;

an imaging start instruction unit that starts imaging by the first imaging unit when the reference determination unit determines that the first reference is not satisfied; and a correction procedure determination unit that determines whether or not to perform correction by the correction unit and a type of image data to be a reference of correction when correction by the correction unit is performed on the basis of a result of comparing at least one of sensitivity, resolution, a flare component, or a diffracted light component between the image data imaged by the first imaging unit and the image data imaged by the second imaging unit.

When the correction procedure determination unit determines a type of image data to be a reference of correction, the learning unit may learn a correlation between at least one of sensitivity, resolution, a flare component, or a diffracted light component of the determined image data and at least one of sensitivity, resolution, a flare component, or a diffracted light component of the image data imaged by the second imaging unit.

A sensor that detect at least one of a shape or a color of an object;

a reliability estimation unit that estimates reliability of learning by the learning unit;

an object identification determination unit that determines whether or not the object can be identified on the basis of detection data of the sensor in a case where the reliability estimated by the reliability estimation unit is equal to or less than a predetermined second reference; and a color specification determination unit that determines whether or not the color of the object identified by the sensor can be specified in a case where the object identification determination unit determines that the object can be identified, and in a case where the color specification determination unit determines that the color of the object can be specified, the correction unit may correct the image data imaged by the second imaging unit so as to approach the specified color.

The correction unit may set a noise removal degree of a pixel region having a luminance change of a predetermined reference value or less in the image data imaged by the second imaging unit to be higher than a noise removal degree of a pixel region having a luminance change larger than the reference value in the image data.

There may be provided:

a light emitting unit that emits light in an infrared light wavelength band; and a light emission control unit that controls a light emission timing of the light emitting unit such that a subject is illuminated with light emitted by the light emitting unit when image data is imaged by the first imaging unit.

The light emitting unit may include a plurality of light sources that emits light in light emission wavelength bands different from each other in the infrared light wavelength band, the light emission control unit may sequentially switch and control light emission by the plurality of light sources while the first imaging unit performs imaging, the first imaging unit may output a plurality of pieces of image data imaged in emission light wavelength bands different from each other, and the correction unit may correct the image data imaged by the second imaging unit on the basis of the plurality of pieces of image data.

The light emitting unit may be disposed on a display surface side of the display unit.

At least one of the first imaging unit or the second imaging unit may include a pixel that captures an image of light in an infrared light wavelength band and a pixel that captures an image of light in a visible light wavelength band.

The first imaging unit may have sensitivity to light of 550 nm or more.

The correction unit may increase the degree of correction toward a shorter wavelength side with respect to the image data imaged by the second imaging unit.

The first imaging unit may include a photoelectric conversion unit arranged to be longer in a normal direction of a light incident surface than the second imaging unit.

An area of the first imaging unit in a light incident surface direction per pixel may be larger than an area of the second imaging unit in a light incident surface direction per pixel, and an area of all the pixels of the first imaging unit in the light incident surface direct on may be smaller than an area of all the pixels of the second imaging unit in the light incident surface direction.

According to another aspect of the present disclosure, there is provided an imaging device including:

a first imaging unit that is disposed on a side opposite to a display surface of a display unit and is capable of capturing an image of light in an infrared light wavelength band;

a second imaging unit that is disposed on a side opposite to a display surface of the display unit and is capable of capturing an image of light in a visible light wavelength band; and a correction unit that corrects image data imaged by the second imaging unit on the basis of image data imaged by the first imaging unit.

According to another aspect of the present disclosure, there is provided an imaging device including:

a first imaging unit capable of capturing an image of light in an infrared light wavelength band;

a second imaging unit capable of capturing an image of light in a visible light wavelength band; and a correction unit that corrects image data imaged by the second imaging unit on the basis of image data imaged by the first imaging unit.

BRIEF DESCRIPTION OF DRAWINGS

FIG. 4 is a block diagram illustrating an internal configuration of the electronic device according to a first embodiment.

FIG. 8 is a flowchart illustrating a first example of a processing operation performed by a signal processing unit in the electronic device according to the second embodiment.

FIG. 9 is a flowchart illustrating a second example of a processing operation performed by the signal processing unit in a case where a multi-spectral sensor is used.

FIG. 10A is a diagram illustrating a first example of pixel arrangement.

FIG. 10B is a diagram illustrating a second example of the pixel arrangement.

MODE FOR CARRYING OUT THE INVENTION

Hereinafter, embodiments of as electronic device and an imaging device will be described with reference to the drawings. Hereinafter, the main components of the electronic device and the imaging device will be mainly described, but the electronic device and the imaging device may have components and functions that are not illustrated or described. The following description does not exclude components and functions that are not illustrated or described.

First Embodiment

Figure 1:
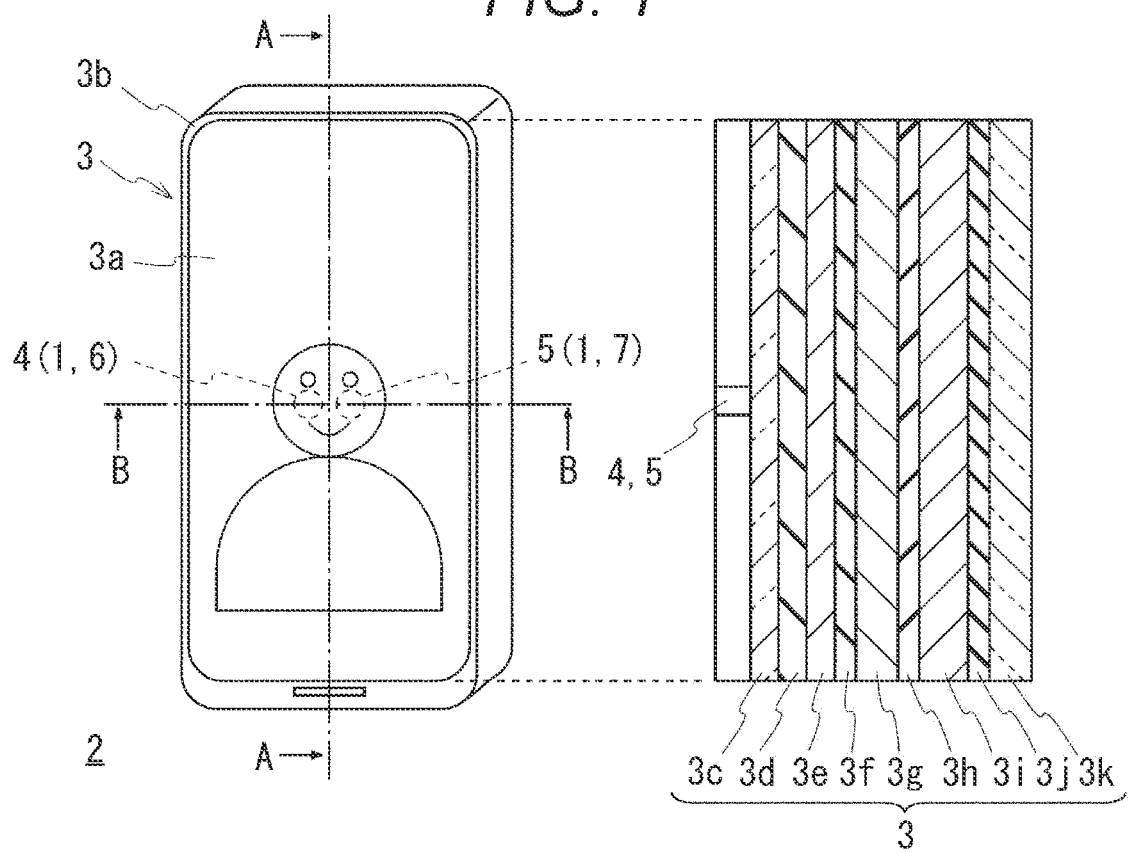
FIG. 1 is an external view and a cross-sectional view taken along line A-A of an electronic device equipped with an imaging device.
Figure 2:
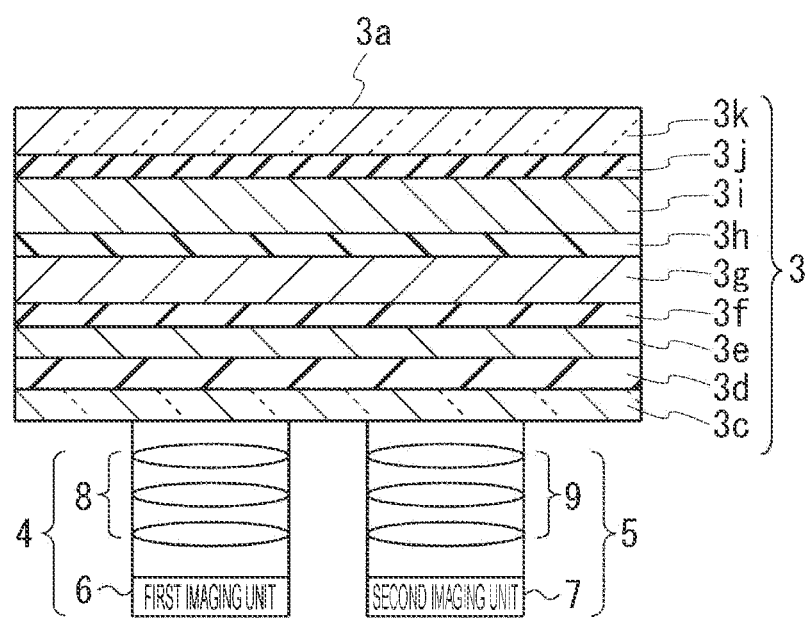
FIG. 2 is a cross-sectional view taken along line B-B in FIG. 1.

FIG. 1 is an external view and a cross-sectional view taken along line A-A of an electronic device 2 on which an imaging device 1 according to a first embodiment is mounted, and FIG. 2 is a cross-sectional view taken along line B-B of FIG. 1. The electronic device 2 according to the present embodiment is any electronic device 2 having both a display function and a capturing function, such as a smartphone, a mobile phone, a tablet, or a PC. The electronic device 2 of FIG. 1 includes camera modules (first and second imaging units) 4 and 5 arranged on the opposite side of a display surface 3a of a display unit 3, As described above, in the electronic device 2 of FIG. 1, the camera modules 4 and 5 are provided on the back side of the display surface 3a of the display unit 3. Therefore, the camera modules 4 and 5 perform capturing through the display unit 3.

The imaging device 1 according to the present embodiment includes a plurality of camera modules 4 and 5. In the present specification, an example in which two camera modules 4 and 5 are provided will be mainly described, but three, or more camera modules may be provided. Hereinafter, an example in which the imaging device 1 includes two camera modules 4 and 5 will be mainly described. As described later, the camera module 4 includes a first imaging unit 6, and the camera module 5 includes a second imaging unit 7. The first imaging unit 6 can capture an image of light in an infrared light wavelength band that has passed through the display unit 3, The infrared light wavelength band is, for example, a wavelength band within a range of 780 nm to 1000 nm, The second imaging unit 7 can capture an image of light in a visible light wavelength band that has passed through the display unit 3. The visible light wavelength band is, for example, a wavelength band within a range of 380 nm to 750 nm.

In the electronic device 2 according to the present embodiment, the display surface 3a spreads to the vicinity of the outer size of the electronic device 2, and the width of a bezel 3b around the display surface 3a is set to several mm or less. Normally, a front camera is often mounted on the bezel 3b, but in FIG. 1, as indicated by a broken line circle, a plurality of camera modules 4 and 5 functioning as front cameras is arranged on a back surface side of the substantially central portion of the display surface 3a. In this way, by providing the front camera on the back surface side of the display surface 3a, it is not necessary to dispose the front camera in the bezel 3b, and the width of the bezel 3b can be narrowed.

Note that, in FIG. 1, the camera modules 4 and 5 are arranged on the back surface side of the substantially central portion of the display surface 3a, but the camera modules 4 and 5 may be arranged at any place on the back surface side of the display surface 3a, and for example, the camera modules 4 and 5 may be arranged on the back surface side near the peripheral edge portion of the display surface 3a. In this manner, the plurality of camera modules 4 and 5 in the present embodiment is arranged at any positions on the back surface side overlapping the display surface 3a.

As shown in FIGS. 1 and 2, the display unit 3 is a laminated body in which a protective film 3c, a polyimide substrate 3d, a display layer 3e, a barrier layer 3f, a touch sensor layer 3g, an adhesive layer 3h, a circularly polarizing plate 3i, an optical clear adhesive (OCA) 3j, and a cover glass 3k are sequentially laminated. The display layer 3e may be, for example, an organic light emitting device (OLED) display layer, a liquid crystal display layer, a microLED, or a display layer based on another display principle. The display layer 3e may include a plurality of layers. For example, the display layer 3e may include a color filter layer, a backlight layer, and the like. The display unit 3 performs display using light in the visible light wavelength range, but the light displayed on the display unit 3 may include an infrared light component.

The barrier layer 3f is a layer that prevents oxygen and moisture from entering the display layer 3e. A touch sensor is incorporated in the touch sensor layer 3g. There are various types of touch sensors such as a capacitive type and a resistive film type, but any type may be adopted. In addition, the touch sensor layer 3g and the display layer 3e may be integrated.

The adhesive layer 3h is provided for bonding the circularly polarizing plate 3i and the touch sensor layer 3g. A material having high visible light transmittance is used for the adhesive layer 3h. The circularly polarizing plate 3i is provided for reducing glare and enhancing visibility of the display surface 3a even in a bright environment. The optical clear adhesive 3j is provided for enhancing adhesion between the circularly polarizing, plate 3i and the cover glass 3k. A material having high visible light transmittance is used for the optical clear adhesive 3j. The cover glass 3k is provided for protecting the display layer 3e and the like. Note that the layer configuration of the display unit 3 is not necessarily limited to that illustrated in FIGS. 1 and 2.

As illustrated in FIG. 2, the camera module 4 includes a first optical system 8 in association with the first imaging unit 6. Similarly, the camera modules 4 and 5 have a second optical system 9 in association with the second imaging unit 7. The first and second optical systems 8 and 9 are arranged on the light incident surface side of the first and second imaging units 6 and 7, that is, on the side close to the display unit 3, and collect the light passing through the display unit 3 to the first and second imaging units 6 and 7. The optical system 5 is usually configured by a plurality of lenses, but a specific optical configuration of the optical system is not limited.

As will be described later, the first imaging unit 6 includes a first photoelectric conversion unit, and the second imaging unit 7 includes a second photoelectric conversion unit. The first photoelectric conversion unit and the second photoelectric conversion unit photoelectrically convert light incident via the display unit 3. The first photoelectric conversion unit and the second photoelectric conversion unit have different optical wavelength bands in which photoelectric conversion can be performed. The first photoelectric conversion unit mainly photoelectrically converts light in an infrared light wavelength band, and the second photoelectric conversion unit mainly photoelectrically converts light in a visible light wavelength band. The first photoelectric conversion unit and the second photoelectric conversion unit may be complementary metal oxide semiconductor (CMOS) sensors or charge coupled device (CCD) sensors. Furthermore, the photoelectric conversion unit may be a photodiode or an organic photoelectric conversion film.

The first and second photoelectric conversion units each have a photoelectric conversion element such as a CMOS sensor for each pixel. Each pixel can be arranged in any manner. Specifically, the arrangement system of each pixel may be a Bayer arrangement, an interline arrangement, a checkered arrangement, a stripe arrangement, or other arrangements.

As illustrated in FIGS. 1 and 2, in the electronic device 2 according to the present embodiment, the plurality of camera modules 4 and 5 captures an image of subject light transmitted through the display unit 3. As illustrated in FIG. 1, the display unit 3 includes a plurality of layers, and each layer has no problem as long as the transmittance of light in a wavelength band in which the first imaging unit 6 and the second imaging unit 7 have sufficient sensitivity is high. However, in practice, there is a possibility that the transmittance of some layers is low. For example, in the polyimide substrate 3d, while the visible light transmittance is not so high, the infrared light transmittance is higher than the visible light transmittance.

Figure 3A:
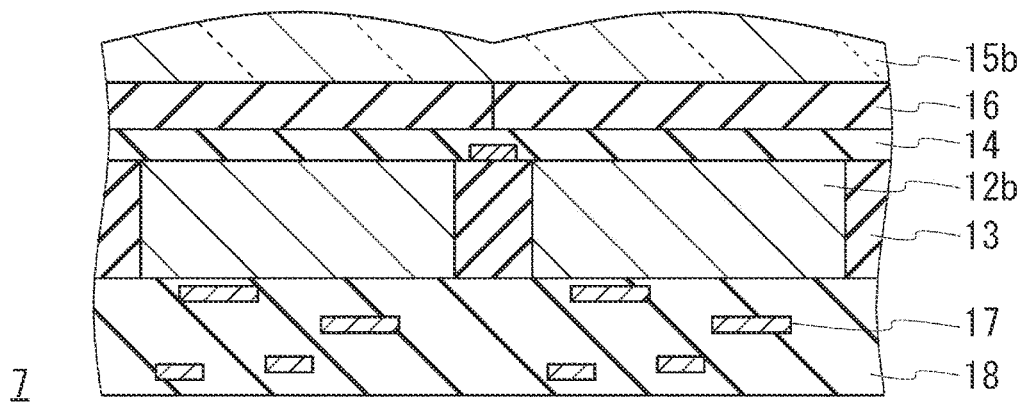
FIG. 3A is a cross-sectional view illustrating an example of a cross-sectional structure of a first imaging unit.
Figure 3B:
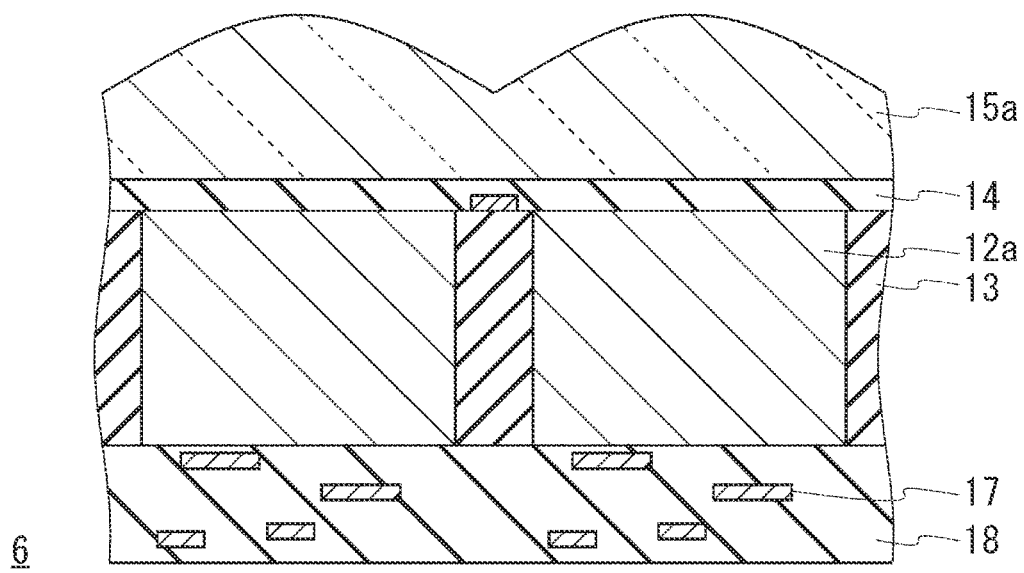
FIG. 3B is a cross-sectional view illustrating an example of a cross-sectional structure of a second imaging unit.

Therefore, in the present embodiment, a correction unit to be described later is provided, and the captured image data of the second imaging unit 7 that captures an image of light in the visible light wavelength band is corrected on the basis of the captured image data of the first imaging unit 6 that captures an image of light in the infrared light wavelength band FIG. 3A is a cross-sectional view illustrating an example of a cross-sectional structure of the first imaging unit 6, and FIG. 3B is a cross-sectional view illustrating an example of a cross-sectional structure of the second imaging unit 7. The first imaging unit 6 illustrated in FIG. 3A includes a first photoelectric conversion unit 12a formed in a semiconductor substrate 11, and the first photoelectric conversion unit 12a is divided by an element isolation layer 13 for each pixel. A flattening layer 14 is disposed on the first photoelectric conversion unit 12a, and an on-chip lens 15a is disposed thereon. The light is incident through the on-chip lens 15a. Therefore, the on-chip lens 15a becomes a light incident surface. In the present specification, the side on which the on-chip lens 15a is disposed is referred to as a back surface side of the first imaging unit 6.

On the other hand, the second imaging unit 7 illustrated in FIG. 3B includes a second photoelectric conversion unit 12b formed in the semiconductor substrate, and the second photoelectric conversion unit 12b is divided by the element isolation layer 13 for each pixel. The flattening layer 14 is disposed on the second photoelectric conversion unit 12b, and a color filter layer 16 is disposed thereon. The color filter layer 16 may have filter layers of three colors of RGB, or may have filter layers of cyan, magenta, and yellow which are complementary colors thereof. An on-chip lens 15b is disposed on the color filter layer 16.

As can be seen by comparing the cross-sectional views of FIGS. 3A and 3B, the first photoelectric conversion unit 12a of the first imaging unit 6 is longer than the second photoelectric conversion unit 12b of the second imaging unit 7 in the normal direction of the light incident surface. This is because the photoelectric conversion efficiency of the light in the infrared light wavelength band is worse than the photoelectric conversion efficiency of the light in the visible light wavelength band, and the length of the light incident surface of the first photoelectric conversion unit 12a in the normal direction is made longer to improve the photoelectric conversion efficiency.

Furthermore, since infrared light is less likely to be refracted than visible light, as illustrated in FIGS. 3A and 3B, the curvature of the on-chip lens 15a of the first imaging unit 6 may be made larger than the curvature of the on-chip lens 15b of the second imaging unit 7.

The area of the first imaging unit 6 in the light incident surface direction per pixel may be made larger than the area of the second imaging unit 7 in the light incident surface direction per pixel. The first imaging unit 6 is provided for correcting the sensitivity or the like of the captured image of the second imaging unit 7 and a larger area is desirable because the sensitivity can be improved.

On the other hand, the area (effective pixel area) in the light incident surface direction including all the pixels of the second imaging unit 7 may be larger than the area (effective pixel area) in the light incident surface direction including all the pixels of the first imaging unit 6. The first imaging unit 6 is for correcting the captured image of the second imaging unit 7, and may be provided at a ratio of one pixel to a plurality of pixels of the second imaging unit 7, for example. Note that the sizes and the number of pixels of the first imaging unit 6 and the second imaging unit 7 are not limited to those described above. A specific layout arrangement example of the first imaging unit 6 and the second imaging unit 7 will be described later. On the front surface side (the side opposite to the on-chip lenses 15a and 15b) of the first imaging unit 6 and the second imaging unit 7, a read circuit 17 is formed on the semiconductor substrate 11, and the periphery of the read circuit 17 is covered with an interlayer insulating film 18. The read circuit 17 includes a transfer transistor, a reset transistor, an amplification transistor, a selection transistor, and the like. Note that the cross-sectional structures of the first imaging unit 6 and the second imaging unit 7 are not limited to those illustrated in FIG. 3.

FIG. 4 is a block diagram illustrating an internal configuration of the electronic device 2 according to the first embodiment. As illustrated in FIG. 4, the electronic device 2 includes the imaging device 1, an application processor 21, a video signal generation unit 22, an A/D conversion unit 23, a display control unit 24, and the display unit 3.

The imaging device 1 can include one or a plurality of semiconductor devices. More specifically, the imaging device 1 includes the first and second camera modules 4 and 5, the first optical system 8 corresponding to the first imaging unit 6, the second optical system 9 and an infrared ray (IR) cut filter 10 corresponding to the second imaging unit 7, a first A/D conversion unit 31 corresponding to the first imaging unit 6, a second A/D conversion unit 32 corresponding to the second imaging unit 7, a signal processing unit 33, an imaging control unit 34, and an output unit 35. The first and second camera modules 4 and 5 may be mounted on a common substrate.

The first A/D conversion unit 31 converts an analog pixel signal photoelectrically converted by the first photoelectric conversion unit 12a into digital pixel data. The second A/D conversion unit 32 converts an analog pixel signal photoelectrically converted by the second photoelectric conversion unit 12b into digital pixel data.

As will be described later, the signal processing unit 33 generates image data corresponding to captured images by the first imaging unit 6 and the second imaging unit 7. The signal processing unit 33 functions as a correction unit that corrects the sensitivity of the image data imaged by the second imaging unit 7 on the basis of the image data imaged by the first imaging unit 6. The imaging control unit 34 controls whether or not the first imaging unit 6 performs imaging in accordance with an instruction from the signal processing unit 33.

The application processor 21 is a semiconductor device separate from the first and second camera modules 4 and 5, and is mounted on the same or a different substrate from the first and second camera modules 4 and 5. The application processor 21 includes a central processing unit (CPU) and the like therein, and executes programs such as an operating system and various application software. The application processor 21 may have a function of performing image processing, signal processing, or the like, of a graphics processing unit (CPU), a baseband processor, or the like. The application processor 21 executes various processing on the input image data and calculation result as necessary, performs control to display an image on the display unit 3 of the electronic device 2, or performs transmission to an external cloud server via a predetermined network.

The video signal generation unit 22 generates a video signal to be displayed on the display unit 3. The A/D conversion unit 23 converts the video signal into digital pixel data. The display control unit 24 performs control to display the digital pixel data on the display unit 3.

Figure 5:
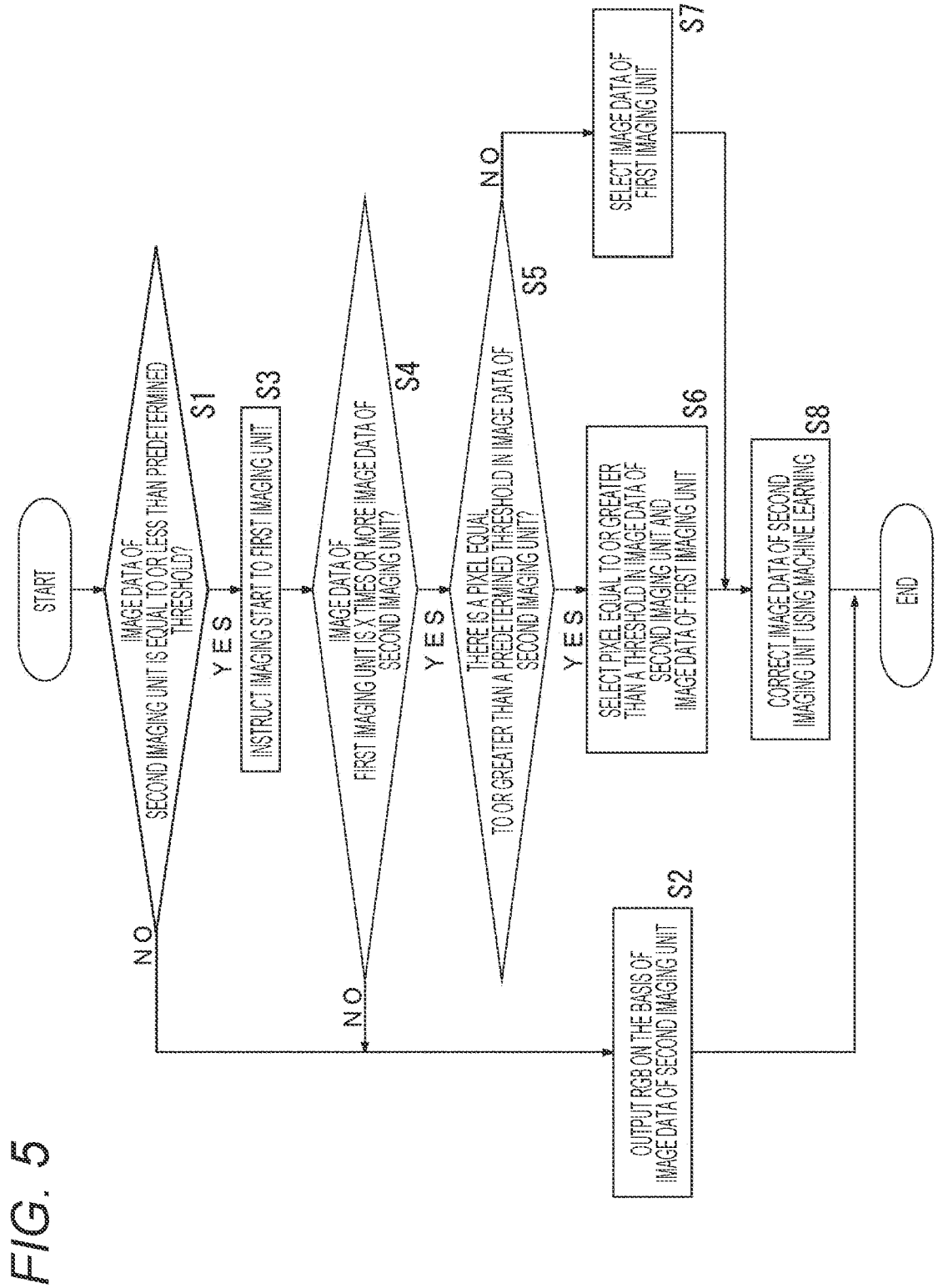
FIG. 5 is a flowchart illustrating a first example of a processing operation of a signal processing unit according to the first embodiment.

FIG. 5 is a flowchart illustrating a first example of a processing operation of the signal processing unit 33 according to the first embodiment. The flowchart of FIG. 5 corrects the sensitivity of the image data imaged by the second imaging unit 7 on the basis of the image data imaged by the first imaging unit 6.

First, it is determined whether or not the pixel value of the image data imaged by the second imaging unit 7 is equal to or less than a predetermined threshold (step S1). Here, the average pixel value of the image data imaged by the second imaging unit 7 may be compared with a predetermined threshold, or the pixel value of a partial pixel region of the image data imaged by the second imaging unit 7 may be compared with a predetermined threshold.

In a case where it is determined in step S1 that the pixel value is not equal to or less than the predetermined threshold, it can be estimated that the image data imaged by the second imaging unit 7 has sufficient sensitivity, and thus, predetermined signal processing is performed on the basis of the image data imaged by the second imaging unit 7 to generate and output ROB data (step S2).

On the other hand, in a case where it is determined in step S1 that the pixel value is equal to or less than the predetermined threshold, it can be estimated that the sensitivity of the image data imaged by the second imaging unit 7 is insufficient, and thus, imaging start is instructed to the first imaging unit 6 via the imaging control unit (step S3). The first imaging unit 6 may include a plurality of imaging sensors capable of separately capturing an image of light in a plurality of narrow wavelength bands (for example, 750 nm, 800 nm, 850 nm, and the like) in the infrared light wavelength band.

Thereafter, the pixel value of the image data imaged by the first imaging unit 6 is compared with the pixel value of the image data imaged by the second imaging unit 7 (step S4). In step S4, for example, it is determined whether or not the pixel value of the image data imaged by the first imaging unit 6 is X times (X is a predetermined reference value larger than 1) or more the pixel value of the image data imaged by the second imaging unit 7. The value of X may be set and changed by the user.

When NO is determined in step S4, it can be estimated that the image data imaged by the first imaging unit 6 is not so sensitive, and thus the processing of step S2 described above is performed without performing the correction processing. When YES is determined in step S4, it can be estimated that the sensitivity of the image data imaged by the first imaging unit 6 is sufficiently high, and thus it is determined whether or not there is a pixel having a pixel value equal to or greater than a predetermined threshold in the image data imaged by the second imaging unit 7 (step S5). The reason why the determination processing in step S5 is provided is that, if there is pixel data having a large pixel value in the captured image data of the second imaging unit 7 that captures an image of light in the visible light wavelength band, the pixel data is regarded as effective data with high sensitivity.

When YES is determined in step S5, pixel data having a pixel value equal to or greater than a predetermined threshold and image data imaged by the first imaging unit 6 are selected as effective data in the image data imaged by the second imaging unit 7 (step S6).

When NO is determined in step S5, it can be estimated that the image data imaged by the second imaging unit 7 is not reliable, and thus the image data imaged by the first imaging unit 6 is selected as effective data (step S7).

Next, the image data imaged by the second imaging unit 7 is corrected on the basis of the effective data selected in step S6 or S7 (step S8). Here, for example, a learning model in which a correlation between the sensitivity of the image data imaged by the first imaging unit 6 and the sensitivity of the image data imaged by the second imaging unit 7 is learned in advance is generated. For example, a convolution neural network (CNN) is used to extract features of an image for appropriately performing sensitivity correction, and the image data imaged by the first imaging unit 6 is used to generate a learning model that can automatically correct the sensitivity of the image data imaged by the second imaging unit 7. A series of processing for generating a learning model is called machine learning. By performing arithmetic processing by inputting the effective data selected in step S6 or S7 to the learning model in which sufficient learning has been performed, corrected image data is output from the learning model. The output image data is data in which sensitivity is appropriately corrected for each color component of RGB.

As described above, in a case where it is estimated that the pixel value of the image data imaged by the second imaging unit 7 is large and the reliability is high, the signal processing unit 33 outputs the image data without correcting the sensitivity, and in a case where it is estimated that the pixel value is small and the reliability is high, the signal processing unit 33 corrects the sensitivity of the image data imaged by the second imaging unit 7 on the basis of the image data imaged by the first imaging unit 6. When the correction is performed, the correlation between the sensitivity of the image data imaged by the first imaging unit 6 and the sensitivity of the image data imaged by the second imaging unit 7 is learned in advance, and the correction is performed using the learning result.

In FIG. 5, an example of correcting the sensitivity of the image data imaged by the second imaging unit 7 has been described. However, a similar processing procedure can be applied to a case of correcting the resolution of the image data imaged by the second imaging unit 7. The reduction in resolution occurs when a part of light to be incident on the second camera module 5 is lost by passing through the display unit 3. Therefore, by performing processing similar to that in FIG. 5, the image data imaged by the second imaging unit 7 is corrected on the basis of the image data imaged by the first imaging unit 6, whereby the resolution of the image data imaged by the second imaging unit 7 can be improved. At that time, the correction processing in step S8 needs to be processing different from the sensitivity correction. That is, in the case of the sensitivity correction, the learning model for appropriately correcting the sensitivity is generated, but in the case of the resolution correction, the learning model for appropriately correcting the resolution is generated, and the effective data selected in step S6 or S7 can be input to the learning model to obtain the resolution-corrected image data at a stage where the learning model is sufficiently learned. More specifically, the learning model in the case of correcting the resolution learns the correlation between the resolution of the image data imaged by the first imaging unit 6 and the resolution of the image data imaged by the second imaging unit 7. The signal processing unit 33 functioning as a correction unit refers to the learning result in the learning unit and corrects the resolution of the image data imaged by the second imaging unit 7 on the basis of the image data imaged by the first imaging unit 6.

The signal processing unit 33 functioning as a correction unit may increase the degree of correction toward the shorter wavelength side with respect to the image data imaged by the second imaging unit 7. This is because the blue component of the subject light passing through the display unit 3 is more easily absorbed by the display unit 3.

Although the example in which the sensitivity correction or the resolution correction of the image data imaged by the second imaging unit 7 is performed has been described above, there is a possibility that the subject light is reflected or diffracted while passing through the display unit 3, and the subject light affected by flare due to the reflection or diffraction is incident on the first and second camera modules 4 and 5. Therefore, the signal processing unit 33 may perform processing of correcting the influence by flare or diffracted light.

Figure 6:
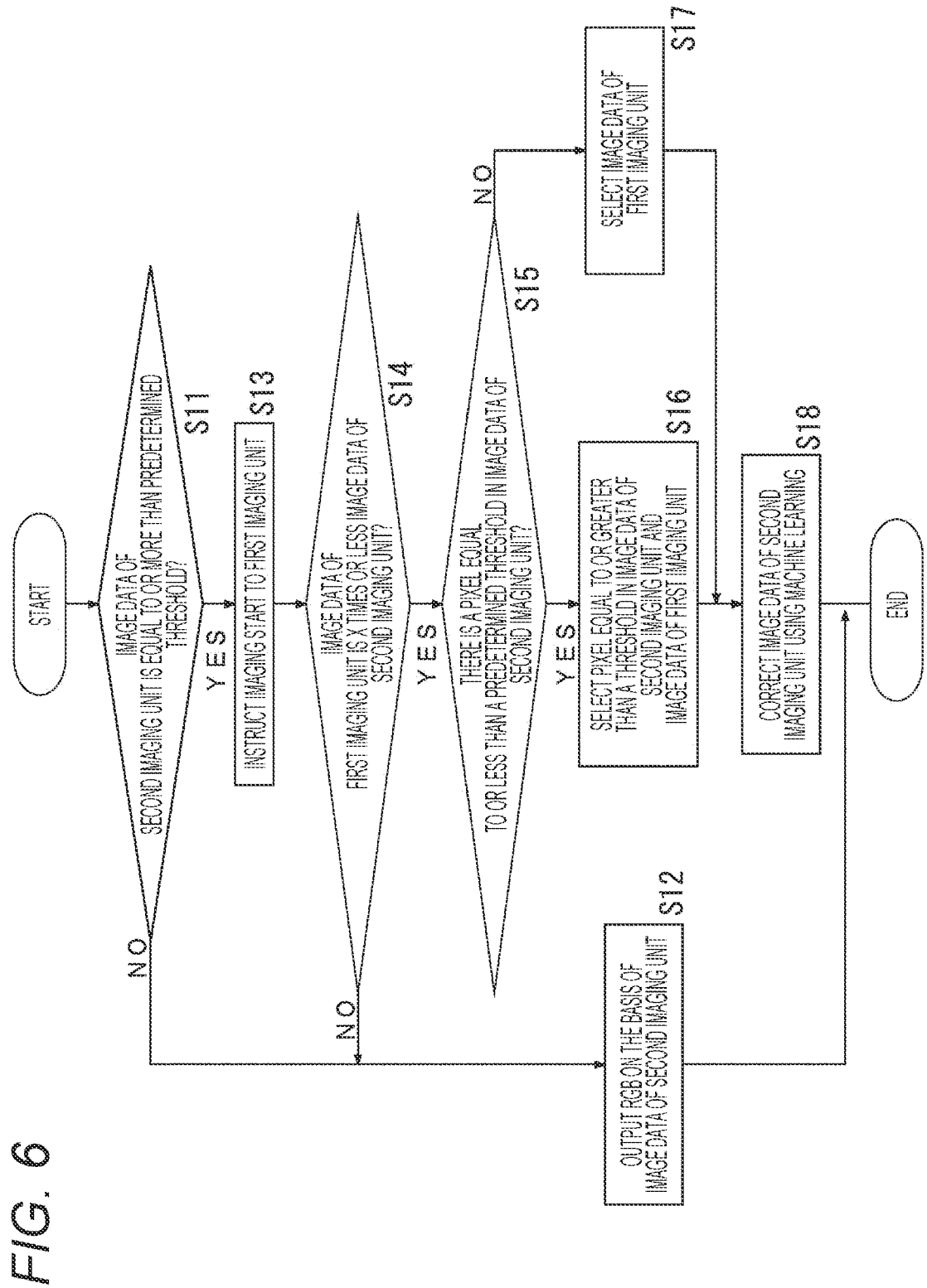
FIG. 6 is a flowchart illustrating a second example of a processing operation of the signal processing unit.

FIG. 6 is a flowchart illustrating a second example of the processing operation of the signal processing unit 33. The flowchart of FIG. 6 corrects the influence by flare or diffraction of image data imaged by the second imaging unit 7 on the basis of the image data imaged by the first imaging unit 6.

First, it is determined whether or not the pixel value of the image data imaged by the second imaging unit 7 is a predetermined threshold or more (step S11). In a case where light incident on the second imaging unit 7 is affected by flare or diffraction, the pixel value generally increases. Therefore, in step S11, it is determined whether or not the pixel value of the image data imaged by the second imaging unit 7 is a predetermined threshold or more, and if the pixel value is less than the threshold, it is determined that the image data is not affected by flare or diffraction, and predetermined signal processing is performed on the basis of the image data imaged by the second imaging unit 7 to generate and output RGB data (step S12).

On the other hand, in a case where it is determined in step S11 that the pixel value is equal to or more than the predetermined threshold, it can be estimated that the image data imaged by the second imaging unit 7 is affected by flare or diffraction, and thus, imaging start is instructed to the first imaging unit 6 via the imaging control unit (step S13).

Thereafter, the pixel value of the image data imaged by the first imaging unit 6 is compared with the pixel value of the image data imaged by the second imaging unit 7 (step S14). Here, as in step S4 in FIG. 5, for example, it is determined whether or not the pixel value of the image data imaged by the first imaging unit 6 is X times (X is a predetermined reference value larger than 1) or less the pixel value of the image data imaged by the second imaging unit 7.

When NO is determined in step S14, it can be estimated that the influence of flare or diffraction of the image data imaged by the second imaging unit 7 cannot be corrected even using the image data imaged by the first imaging unit 6. Therefore, the processing of step S12 is performed without performing the correction processing. When YES is determined in step S14, it can be estimated that the image data imaged by the first imaging unit 6 is not affected by flare or diffraction, and thus, it is determined whether or not there is a pixel having a pixel value equal to or less than a predetermined threshold in the image data imaged by the second imaging unit 7 (step S15).

When YES is determined in step S15, pixel data having a pixel value equal to or less than a predetermined threshold and image data imaged by the first imaging unit 6 are selected as effective data in the image data imaged by the second imaging unit 7 (step S16).

When NO is determined in step S15, it can be estimated that the image data imaged by the second imaging unit 7 is not reliable, and thus the image data imaged by the first imaging unit 6 is selected as effective data (step S17).

Next, the image data imaged by the second imaging unit 7 is corrected on the basis of the effective data selected in step S16 or S17 (step S18). Here, for example, a learning model in which a correlation between at least one of a flare component or a diffracted light component included in image data imaged by the first imaging unit 6 and at least one of a flare component or a diffracted light component included in image data imaged by the second imaging unit 7 has been learned in advance is generated, and the effective data selected in step S16 or S17 is input to the learning model in which sufficient learning has been performed, so that corrected image data is output from the learning model. The output image data is data in which the influence of flare or diffraction is appropriately corrected for each color component of RGB.

To summarize the processing of the flowcharts of FIGS. 5 and 6, the signal processing unit 33 performs processing of a reference determination unit (step S1, S11), an imaging start instruction unit (step S2, S12), and a correction procedure determination unit (steps S3 to S8, S13 to S18). The reference determination unit determines whether or not at least one of the sensitivity, the resolution, the flare component, or the diffracted light component of the image data imaged by the second imaging unit 7 satisfies a predetermined first reference. When the reference determination unit determines that the first reference is not satisfied, the imaging start designation unit starts imaging by the first imaging unit 6. The correction procedure determination unit determines whether or not to perform correction by the correction unit and a type of image data to be a reference of correction when correction by the correction unit is performed on the basis of a result of comparing at least one of sensitivity, resolution, a flare component, or a diffracted light component between image data imaged by the first imaging unit 6 and image data imaged by the second imaging unit 7. When the type of image data to be a reference of correction is determined by the correction procedure determination unit, the signal processing unit 33 (learning unit) learns a correlation between at least one of sensitivity, resolution, a flare component, or a diffracted light component of the determined image data and at least one of sensitivity, resolution, a flare component, or a diffracted light component of the image data imaged by the second imaging unit 7.

Note that the processing of FIG. 5 and the processing of FIG. 6 may be performed in combination. That is, the signal processing unit 33 may correct two or more of the sensitivity, the resolution, the influence by the flare component, and the influence by the diffracted light component of the image data imaged by the second imaging unit 7 on the basis of the image data imaged by the first imaging unit 6.

As described above, in the first embodiment, the image data imaged by the second imaging unit 7 that captures an image of light in the visible light wavelength band is corrected as necessary on the basis of the image data imaged by the first imaging unit 6 that captures an image of light in the infrared light wavelength band. Therefore, even if the subject light is incident on the first and second camera modules 4 and 5 through the display unit 3, there is no possibility that sensitivity or resolution is reduced, and the subject light is not affected by flare or diffraction.

Second Embodiment

In the second embodiment, a measure is taken in a case where sufficient learning is not performed in the machine learning performed in step S8 of FIG. 5 or step S18 of FIG. 6.

Figure 7:
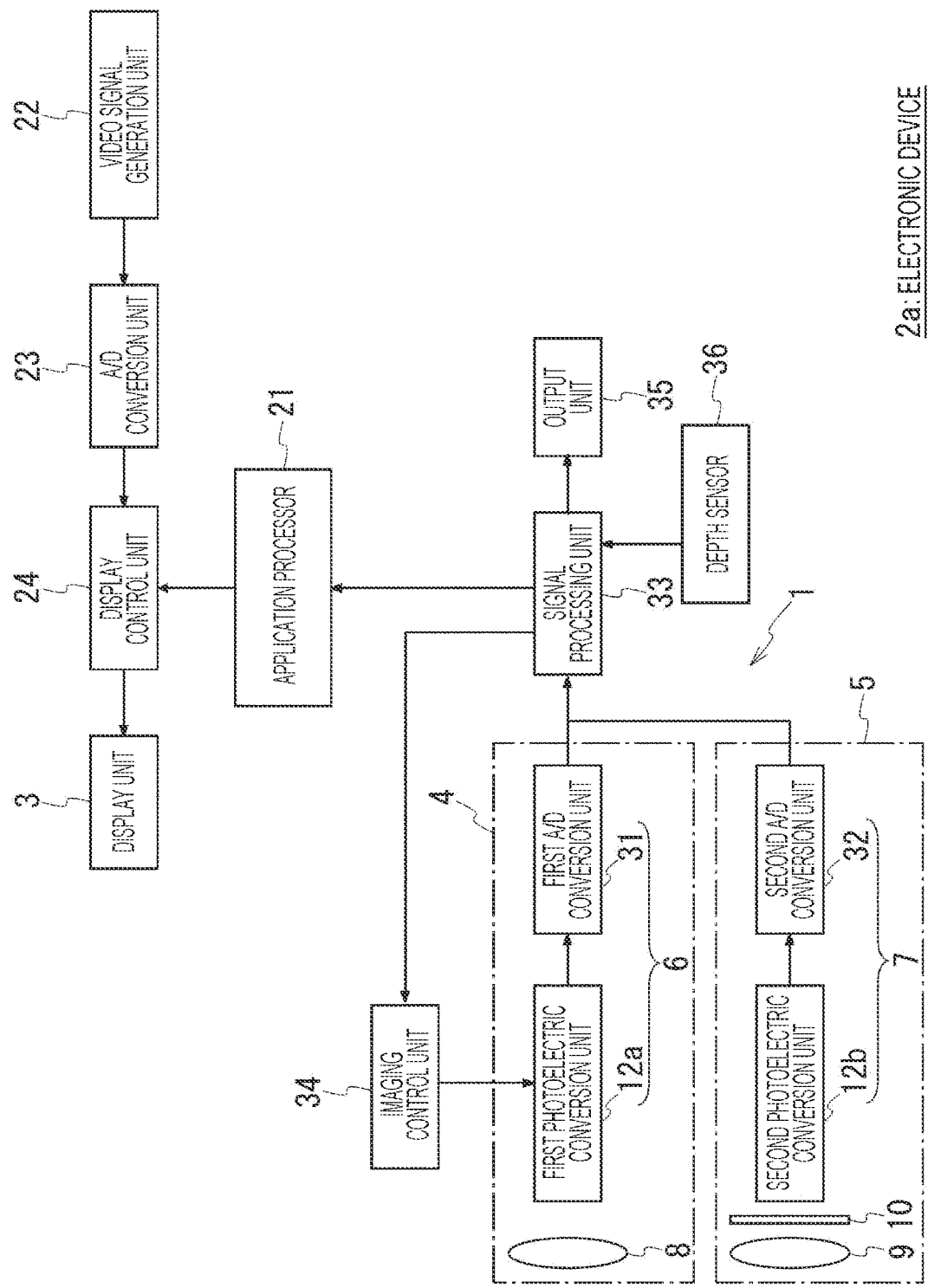
FIG. 7 is a block diagram illustrating an internal configuration of an electronic device according to a second embodiment.

FIG. 7 is a block diagram illustrating an internal configuration of an electronic device 2*a* according to the second embodiment. The electronic device 2*a* of FIG. 7 includes a depth sensor 36 in addition to the configuration of FIG. 4. The depth sensor 36 is a sensor that detects distance information to an object. The depth sensor 36 may detect the distance information by, for example, an indirect time of flight (ToF) method. The depth sensor 36 is disposed, for example, in a portion of the bezel 3*b* on the display surface side of the electronic device 2 in FIG. 1. The distance information detected by the depth sensor 36 is transmitted to the signal processing unit 33.

FIG. 8 is a flowchart illustrating a first example of a processing operation performed by the signal processing unit 33 in the electronic device 2*a* according to the second embodiment. The signal processing unit 33 performs the processing of FIG. 8 after performing the processing of FIG. 5 or 6.

First, it is determined whether or not machine learning has been sufficiently performed (step S21). When input data is given to a learning model generated by machine learning, arithmetic processing is performed using the learning model, and output data is generated. If the input data is data within a range assumed in advance, appropriate output data reflecting the result of the machine learning can be obtained by performing interpolation processing. However, in a case where the input data is data outside the range assumed in advance, it is necessary to perform extrapolation processing, and the accuracy of the output data decreases. Therefore, in step S21, for example, it is determined whether or not the machine learning has been sufficiently performed on the basis of whether or not the extrapolation processing is necessary for the input data. Note that whether or not the machine learning has been sufficiently performed may be determined by another method.

In a case where ft is determined in step S21 that the machine learning has been sufficiently performed, the data subjected to the arithmetic processing by the learning model is output without performing color correction (step 22).

In a case where it is determined in step S21 that the machine learning has not been sufficiently performed, the distance information is detected by the depth sensor 36 (step S23). Next, on the basis of the distance information detected by the depth sensor 36, the shape of the object captured in corrected imaging data in the processing of FIG. 5 or FIG. 6 is grasped to identify the object (step S24). In a case where the signal processing unit 33 alone cannot identify an object, the imaging data corrected in the processing of FIG. 5 or FIG. 6 and the distance information detected by the depth sensor 36 may be transmitted to a cloud server or the like via a network, an object may be specified by performing shape analysis of the object using enormous data (big data) managed by the cloud server or the like, and the information of the specified object may be received by the signal processing unit 33 via the network. Alternatively, the imaging data corrected in the processing of FIG. 5 or 6 and the distance information detected by the depth sensor 36 may be transmitted to the application processor, and the application processor may specify the object.

Next, it is determined whether or not the color of the object identified in step S24 is known (step S25). When the color of the object is not known, the color correction is abandoned, and the processing of step S22 is performed. When the color of the object is known, color correction is performed so as to approach the known color (step 826). Here, a database for managing the color information of the identified object may be provided, and the database may be accessed to acquire the color information of the identified object.

As described above, in the processing of FIG. 8, in a case where learning has not been sufficiently performed by machine learning, the shape of the object is detected using the depth sensor 36 to identify the object, and color correction is performed on the basis of known color information regarding the identified object.

In FIGS. 7 and 8, an example in which the shape of the object is detected by the depth sensor 36 is illustrated, but information of the object may be detected using another sensor. For example, a multi-spectral sensor may be provided instead of the depth sensor 36 or in addition to the depth sensor 36.

FIG. 9 is a flowchart illustrating a second example of a processing operation performed by the signal processing unit 33 in a case where a multi-spectral sensor is used. The processing in steps S31 to S32 is similar to the processing in steps S21 to S22 in FIG. 8. When it is determined in step S31 that the machine learning has not been sufficiently performed, color information is detected by the multi-spectral sensor (step S33). Since the multi-spectral sensor can separately detect light in a plurality of wavelength bands, color information of an object included in image data imaged by the second imaging unit 7 can be detected in detail. Next, an object is identified from the color information detected in step S33 (step S34). At this time, as described above, the object may be identified by a cloud server or an application processor.

Next, it is determined whether or not the color of the object identified in step S34 is known (step S35). In a case where the color of the object is unknown, color correction is performed on the basis of the color information detected by the multi-spectral sensor (step S36). In a case where the color of the object is known, color correction is performed so as to approach the known color (step S37).

To summarize the processing of the flowcharts of FIGS. 8 and 9, the signal processing unit 33 performs processing of a reliability estimation unit (steps S21 and S31), an object identification determination unit (steps S23 and S33), and a color specification determination unit (steps S24 and q34). The reliability estimation unit estimates the reliability of learning by the learning unit. In a case where the reliability estimated by the reliability estimation unit is equal to or less than a predetermined second reference, the object identification determination unit determines whether or not the object can be identified on the basis of the detection data of the sensor. In a case where the object identification determination unit determines that the object can be identified, the color specification determination unit determines whether or not the color of the object identified by the sensor can be specified. In a case where the color specification determination unit determines that the color of the object can be specified, the signal processing unit 33 functioning as the correction unit corrects the image data imaged by the second imaging unit 7 so as to approach the specified color.

Note that the processing of FIG. 8 and the processing of FIG. 9 may be performed in combination. If the object is specified on the basis of the result of detecting the shape information and the color information of the object by the depth sensor 36, the multi-spectral sensor, or the like, the object can be specified more accurately, and the color correction of the specified object can be performed accurately.

As described above, in the second embodiment, it is not preferable to correct the image data imaged by the second imaging data in a state where learning by machine learning is insufficient. Therefore, in a case where learning by machine learning is insufficient, color correction of the image data imaged by the second imaging unit 7 is performed using another sensor such as the depth sensor 36 or the multi-spectral sensor. As a result, it is possible to avoid a possibility of performing correction with low reliability in a state where learning by machine learning is insufficient.

Third Embodiment

In a third embodiment, the pixel arrangement of the first imaging unit 6 and the second imaging unit 7 is characterized. The first imaging unit 6 that receives and photoelectrically converts light in the infrared light wavelength band includes a plurality of pixels. Similarly, the second imaging unit 7 that receives and photoelectrically converts light in the visible light wavelength band also includes a plurality of pixels. A part of the plurality of pixels constituting the first imaging unit 6 may include pixels capable of receiving light in the visible light wavelength band.

FIG. 10A is a diagram illustrating a first example of pixel arrangement. In the first example illustrated in FIG. 10A, a pixel that receives and photoelectrically converts light in the infrared light wavelength band is denoted as IR, and a pixel that receives and photoelectrically converts light in a wavelength band corresponding to red is denoted as R. In the example of FIG. 10A, IR pixels and R pixels are arranged in a staggered manner. Note that the arrangement order of the IR pixels and the R pixels and the ratio of the number of respective pixels are arbitrary.

Red light has a wavelength component (for example, 550 nm or more) close to infrared light. By arranging the R pixels between the IR pixels, the optical wavelength band that can be received by the first imaging unit 6 can be further expanded. When the signal processing unit 33 described above corrects the image data imaged by the second imaging unit 7 on the basis of the image data imaged by the first imaging unit 6, the red component is included in the image data imaged by the first imaging unit 6, so that adjustment with the red component included in the image data imaged by the second imaging unit 7 is facilitated, and highly reliable correction processing can be performed.

FIG. 10B is a diagram illustrating a second example of the pixel arrangement. In the second example illustrated in FIG. 10B, a part of the plurality of pixels constituting the second imaging unit 7 includes pixels capable of receiving light in the infrared light wavelength band. In FIG. 10B, a pixel that receives and photoelectrically converts light in the visible light wavelength band is denoted as R, G, or G, and a pixel that receives and photoelectrically converts light in the infrared light band is denoted as IR. One IR pixel is disposed for three RGB pixels. Note that the arrangement order of the RGB pixels and the IR pixel and the ratio of the number of respective pixels are arbitrary.

By arranging the IR pixels between the RGB pixels, the first imaging unit 6 and the second imaging unit 7 can be formed on one semiconductor chip. As a result, only one camera module 4 or 5 needs to be provided, and the hardware cost of the electronic device 2 can be reduced.

As described above, in the third embodiment, by arranging the pixels that receive the light in the visible light wavelength band between the pixels that receive the light in the infrared light wavelength band, it is possible to improve the reliability of the correction processing performed by the signal processing unit 33. Furthermore, the first imaging unit 6 and the second imaging unit 7 can be formed on one semiconductor chip by arranging pixels that receive light in the infrared light wavelength band between pixels that receive light in the visible light wavelength band Fourth Embodiment In the first embodiment, an example of correcting the image data imaged by the second imaging unit 7 using machine learning has been described. However, the image data imaged by the second imaging unit 7 can be corrected by the signal processing unit 33 without necessarily using machine learning.

Figure 11:
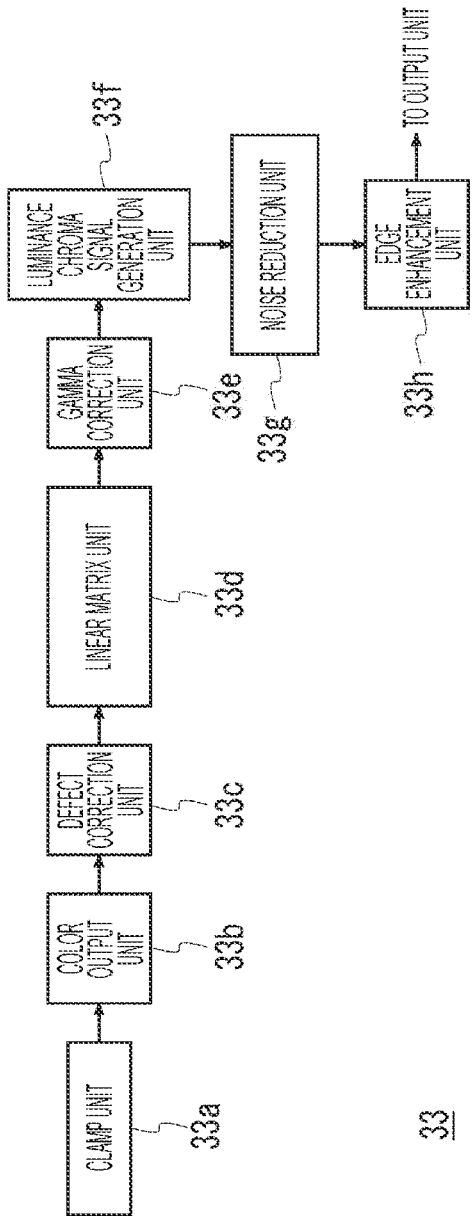
FIG. 11 is a block diagram illustrating a first example of as internal configuration of the signal processing unit.

FIG. 11 is a block diagram illustrating a first example of an internal configuration of the signal processing unit 33. The signal processing unit 33 in FIG. 11 includes a clamp unit 33a, a color output unit 33b, a defect correction unit 33c, a linear matrix unit 33d, a gamma correction unit 33e, a luminance chroma signal generation unit 33f, a noise reduction unit 33g, and an edge enhancement unit 33h.

The clamp unit 33a performs processing of defining a black level. More specifically, the clamp unit 33a performs processing of subtracting the black level data from the digital pixel data. The color output unit 33*b* outputs, for example, pixel data for each color of RGB. The defect correction unit 33*c* performs processing of correcting the imaging data of the specific pixel that cannot be correctly read for some reason from the imaging data of surrounding pixels. The linear matrix unit 33*d* performs matrix operation on color information such as RGB to perform more correct color reproduction. The gamma correction unit 33*e* performs gamma correction so as to enable display with excellent visibility in accordance with the display characteristics of the display unit 3. For example, the gamma correction unit 33*e* performs conversion from 10 bits to 8 bits while changing the gradient. The luminance chroma signal generation unit 33*f* generates a luminance chroma signal to be displayed on the display unit 3 on the basis of the output data of the gamma correction unit 33*e*. The noise reduction unit 33*g* performs processing of reducing noise included in the luminance chrome signal. The edge enhancement unit 33*h* performs processing of enhancing an edge of the subject image on the basis of the luminance chroma signal. The noise reduction processing by the noise reduction unit 33*g* and the edge enhancement processing by the edge enhancement unit 33*h* may be performed only in a case where a predetermined condition is satisfied. The output unit 35 outputs the luminance chroma signal subjected to the noise reduction processing.

The noise reduction unit 33*g* determines whether or not the pixel region is a pixel region with a small luminance change on the basis of the image data imaged by the first imaging unit 6, and increases the noise removal ratio for the pixel region with a small luminance change. More specifically, the noise reduction unit 33*g* sets the noise removal degree of the pixel region in which the luminance change is equal to or less than a predetermined reference value in the image data imaged by the second imaging unit 7 to be higher than the noise removal degree of the pixel region in which the luminance change is larger than the reference value in the image data.

As a result, the data amount of the image data imaged by the second imaging unit 7 can be reduced. On the other hand, the noise removal ratio is weakened for a pixel region with a large luminance change. The reason for this is that as the noise removal ratio is increased, the edge becomes unclear and the resolution also decreases, and in order to sharpen the edge and improve the resolution, it is desirable to weaken the noise removal ratio. However, if the noise removal ratio is weakened for all the pixels, the data amount of the image data becomes enormous. Therefore, it is desirable to weaken the noise removal ratio only in a limited pixel region such as an edge portion.

Figure 12:
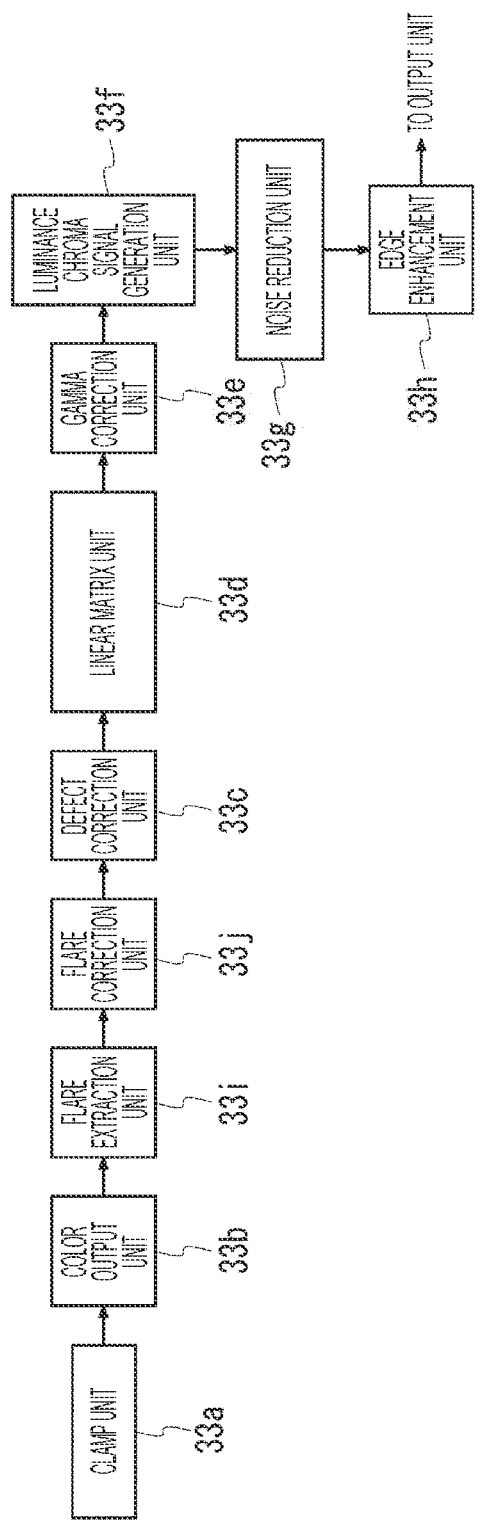
FIG. 12 is a block diagram illustrating a second example of an internal configuration of the signal processing unit.

FIG. 12 is a block diagram illustrating a second example of the internal configuration of the signal processing unit 33. The signal processing unit 33 of FIG. 11 is obtained by providing a flare extraction unit 33*i* and a flare correction unit 33*j* in the signal processing unit 33 of FIG. 11.

The flare extraction unit 33*i* compares the pixel value of the image data imaged by the first imaging unit 6 with the pixel value of the image data imaged by the second imaging unit 7 to extract the degree of influence due to flare or diffraction. For example, the degree of influence due to flare or diffraction may be extracted from a difference between an average pixel value of image data imaged by the first imaging unit 6 and an average pixel value of image data imaged by the second imaging unit 7.

The flare correction unit 33*j* performs processing of subtracting the degree of influence due to flare or diffraction extracted by the flare extraction unit 33*i* from the image data imaged by the second imaging unit 7. As a result, the image data imaged by the second imaging unit 7 is less likely to be affected by flare or diffraction.

As described above, in the fourth embodiment, by referring to the image data imaged by the first imaging unit 6 in the internal processing of the signal processing unit 33, the sensitivity and resolution of the image data imaged by the second imaging unit 7 can be corrected, and the influence due to flare or diffraction can also be suppressed. In addition, by avoiding unnecessary correction, the processing load of the signal processing unit 33 can be reduced, and the data amount of the image data can be reduced.

Fifth Embodiment

In the first to fourth embodiments, the example in which the first imaging unit 6 that receives the light of the infrared light wavelength component is provided has been described, but in addition to this, a light emitting unit that emits light of the infrared light wavelength component may be provided.

Figure 13:
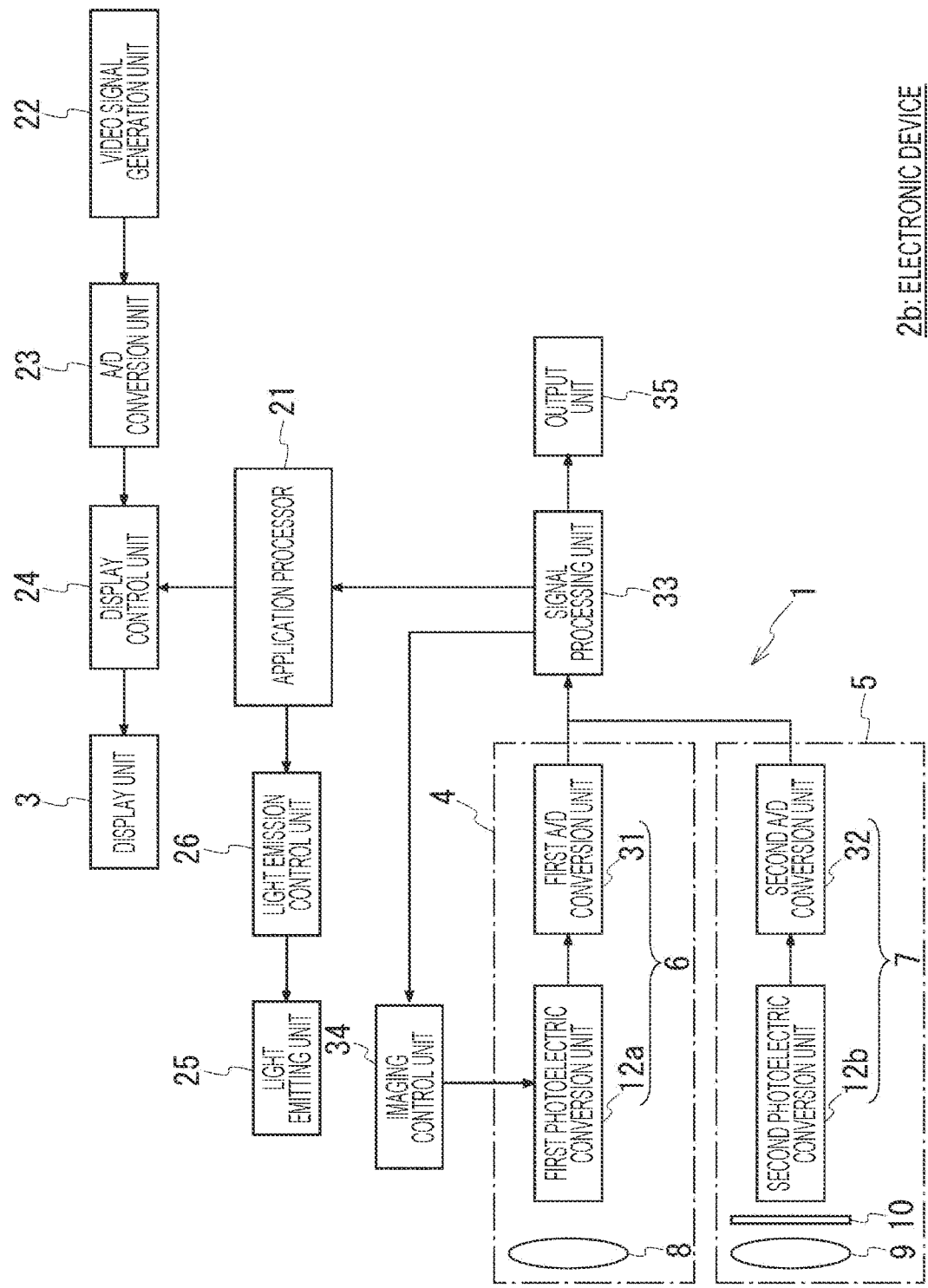
FIG. 13 is a block diagram illustrating a schematic configuration of an electronic device 2 according to a fifth embodiment.

FIG. 13 is a block diagram illustrating a schematic configuration of an electronic device 2*b* according to a fifth embodiment. The electronic device 2*b* in FIG. 13 includes a light emitting unit 25 and a light emission control unit 26 in addition to the configuration of the electronic device 2 in FIG. 4. The light emitting unit 25 emits light in an infrared light wavelength band The light emitting unit 25 is provided on a display surface side of the electronic device 2*b*. For example, the light emitting unit 25 may be provided in the bezel 3*b* portion of the display surface of the electronic device 2*b*.

The light emission control unit 26 controls the light emission timing of the light emitting unit 25 so that the subject is irradiated with the light emitted by the light emitting unit 25 when the first imaging unit 6 images image data. Since light in the infrared light wavelength band cannot be recognized by human eyes, even if the human is irradiated with the light of the light emitting unit 25, there is no possibility that the human feels glare. However, it is necessary to perform irradiation with light intensity and continuous irradiation time that do not damage human eyes.

Note that, in the present embodiment, it is assumed that the first imaging unit 6 and the second imaging unit 7 image the same subject at the same timing. Since the first imaging unit 6 captures an image of light in the infrared light wavelength band, when a subject is imaged by the first imaging unit 6 in a state where the subject is illuminated with light from the light emitting unit 25, a pixel value of image data received by the first imaging unit 6 can be increased, and sensitivity can be increased.

Figure 14:
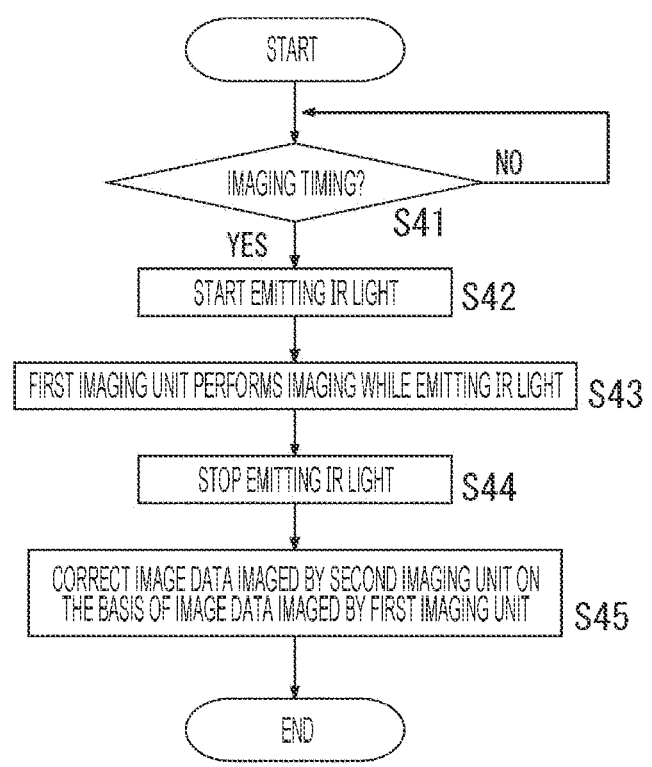
FIG. 14 is a flowchart illustrating a processing operation when the electronic device 2 according to the fifth embodiment performs imaging with first and second camera modules.

FIG. 14 is a flowchart illustrating a processing operation when the electronic device 2*b* according to the fifth embodiment performs imaging with the first and second camera modules 4 and 5. First, it is determined whether or not it is the imaging timing of the first imaging unit 6 and the second imaging unit 7 (step S41). The imaging by the first imaging unit 6 and the second imaging unit 7 is performed in a period in which no image is displayed on the display unit 3, for example, in a vertical blanking period of the display unit 3.

The process waits at step S41 until the imaging timing, and at the imaging timing, the light emitting unit 25 starts emitting light (IR light) in the infrared light band (step S42). For example, in a case where the electronic device 2*b* is a smartphone, in order for the user to focus the first and second camera modules 4 and 5 on the subject, if the traveling direction of the light emitted from the light emitting unit 25 coincides with the optical axis direction of the first and second camera modules 4 and 5, the light from the light emitting unit 25 illuminates the subject even if the user is not particularly conscious.

The first imaging unit 6 performs imaging while the light emitting unit 25 is emitting light (step S43). As a result, even in a case where capturing is performed under a situation where the surroundings are dark, the pixel value of the image data imaged by the first imaging unit 6 can be increased. When the imaging by the first imaging unit 6 and the second imaging unit 7 is completed, the light emitting unit 25 stops light emission (step S44). Thereafter, as in the first embodiment and the like, the image data imaged by the second imaging unit 7 is corrected on the basis of the image data imaged by the first imaging unit 6 (step S45).

As described above, in the fifth embodiment, since the light in the infrared light wavelength band is received by the first imaging unit 6 in a state where the light emitting unit 25 emits infrared light, the pixel value of the image data imaged by the first imaging unit 6 can be increased, the sensitivity can be increased, and the image data imaged by the second imaging unit 7 can be appropriately corrected on the basis of the image data imaged by the first imaging unit 6 even in a situation where the surroundings are dark.

Sixth Embodiment

The sixth embodiment is a modification of the fifth embodiment, and enables switching of a light emission wavelength band of light emitted by the light emitting unit 25.

An electronic device 2b according to the sixth embodiment has a block configuration similar to that in FIG. 13, but the function of the light emitting unit 25 is different. The light emitting unit 25 according to the sixth embodiment includes a plurality of light sources that emits light of different light emission wavelength bands in the infrared light wavelength band. The light emission control unit 26 sequentially switches and controls light emission by the plurality of light sources while the first imaging unit 6 performs imaging. The first imaging unit 6 outputs a plurality of pieces of image data imaged in different light emission wavelength bands.

Figure 15:
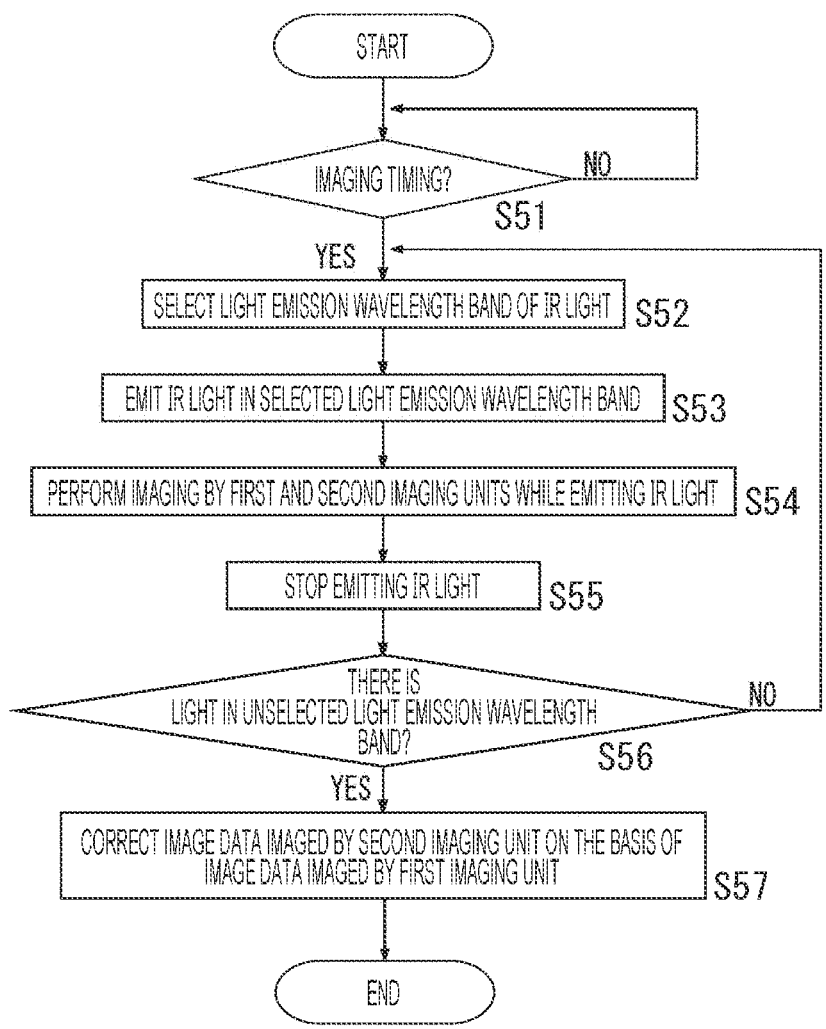
FIG. 15 is a flowchart illustrating a processing operation when the electronic device 2 according to a sixth embodiment performs imaging with the first and second camera modules.

FIG. 15 is a flowchart illustrating a processing operation when the electronic device 2b according to the sixth embodiment performs imaging with the first and second camera modules 4 and 5. First, it is determined whether or not it is the imaging timing of the first imaging unit 6 and the second imaging unit 7 (step S51). At the imaging timing, the light emitting unit 25 selects one of the plurality of light emission wavelength bands in accordance with an instruction from the light emission control unit 26 (step S52), and emits infrared light in the selected light emission wavelength band (step S53). Then, imaging is performed by the first and second imaging units 6 and 7 (step S54), and then light emission of the light emitting unit 25 is stopped (step S55).

Next, it is determined whether or not there is infrared light in the light emission wavelength band that has not yet been selected among the light that can be emitted by the light emitting unit 25 (step S56). In a case where there is infrared light that has not yet been selected, the processing in step S52 and subsequent steps is repeated. When it is determined in step S56 that the processing in steps S52 to S55 has been performed on ail the light that can be emitted by the light emitting unit 25, the image data imaged by the second imaging unit 7 is corrected on the basis of the image data of the plurality of infrared light wavelength bands imaged by the first imaging unit 6 (step S57).

When the first imaging unit 6 performs imaging in a state where illumination is performed in a plurality of different infrared light wavelength bands, there is a possibility that the information captured in the captured image changes little by little, and the image data imaged by the second imaging unit 7 can be corrected more appropriately by correcting the image data imaged by the second imaging unit 7 in comprehensive consideration of these.

As described above, in the sixth embodiment, since the light emitting unit 25 includes a plurality of light sources that emits light of different light emission wavelength bands in the infrared light wavelength band, it is possible to obtain a plurality of captured images imaged by the first imaging unit 6 by performing imaging by the first imaging unit 6 in a state where these light sources sequentially emit light. By correcting the image data imaged by the second imaging unit 7 on the basis of the plurality of captured images, more appropriate correction can be performed.

Seventh Embodiment

In the first to sixth embodiments described above, the example has been described in which the first and second camera modules 4 and 5 capture images of the light having passed through the display surfaces of the electronic device 2, 2a, 2b. However, in a case where the first and second camera modules 4 and 5 are arranged in the bezel 3b portion of the display surface or in a case where the first and second camera modules 4 and 5 are arranged on the back surface side of the electronic device 2, 2a, 2b, the light from the outside is directly incident on the first and second camera modules 4 and 5, and thus, there is no loss of the light amount due to the subject light passing through the display unit 3, and no influence due to flare or diffraction. However, in a case where imaging is performed by the second imaging unit 7 under a situation where the surroundings are dark, there is a case where the sensitivity and resolution of the captured image decrease. Furthermore, in a case where imaging is performed by the second imaging unit 7 under a situation of receiving strong sunlight, the captured image is likely to be affected by flare or diffraction. In such a case, by correcting the image data imaged by the second imaging unit 7 on the basis of the image data imaged by the first imaging unit 6 that receives light in the infrared light wavelength band, sensitivity and resolution can be improved, and the influence due to flare or diffraction can be suppressed. Therefore, the electronic device 2, 2a, 2b according to the first to sixth embodiments can also be applied to a case where the first and second camera modules 4 and 5 are arranged in the bezel 3b portion of the display surface or a case where the first and second camera modules 4 and 5 are arranged on the back surface side of the electronic device 2, 2a, 2b.

Eighth Embodiment

As specific candidates for the electronic device 2 having the configuration described in the first to seventh embodiments, various candidates are conceivable. For example, FIG. 16 is a plan view in a case where the electronic device 2 in the first to seventh embodiments is applied to a capsule endoscope 50. The capsule endoscope 50 of FIG. 16 includes, for example, in a housing 51 having hemispherical both end surfaces and a cylindrical central portion, a camera (ultra-small camera) 52 for capturing an image in a body cavity, a memory 53 for recording image data imaged by the camera 52, and a wireless transmitter 55 for transmitting the recorded image data to the outside via an antenna 54 after the capsule endoscope 50 is discharged to the outside of the subject.

Further, in the housing 51, a central processing unit (CM 56 and a coil (magnetic force/current conversion coil) 57 are provided. The CPU 56 controls capturing by the camera 52 and a data accumulation operation in the memory' 53, and controls data transmission from the memory 53 to a data reception. device (not illustrated) outside the housing 51 by the wireless transmitter 55. The coil 57 supplies power to the camera 52, the memory 53, the wireless transmitter 55, the antenna 54, and a light source 52b to be described later.

Furthermore, the casing 51 is provided with a magnetic (reed) switch 58 for detecting, when the capsule endoscope 50 is set in the data reception device, this setting. The CPU 56 supplies power from the coil 57 to the wireless transmitter 55 when the reed switch 58 detects the setting to the data reception device and data transmission becomes possible.

The camera 52 includes, for example, an imaging element 52a including an objective optical system for capturing an image in a body cavity, and a plurality of light sources 52b for illuminating the body cavity. Specifically, the camera 52 includes, as the light source 52b, for example, a complementary metal oxide semiconductor (CMOS) sensor including a light emitting diode (LED), a charge coupled device (CCD), or the like.

Application Example of Imaging Device 1 and Electronic Device 2 According to Present Disclosure

First Application Example

Figure 16A:
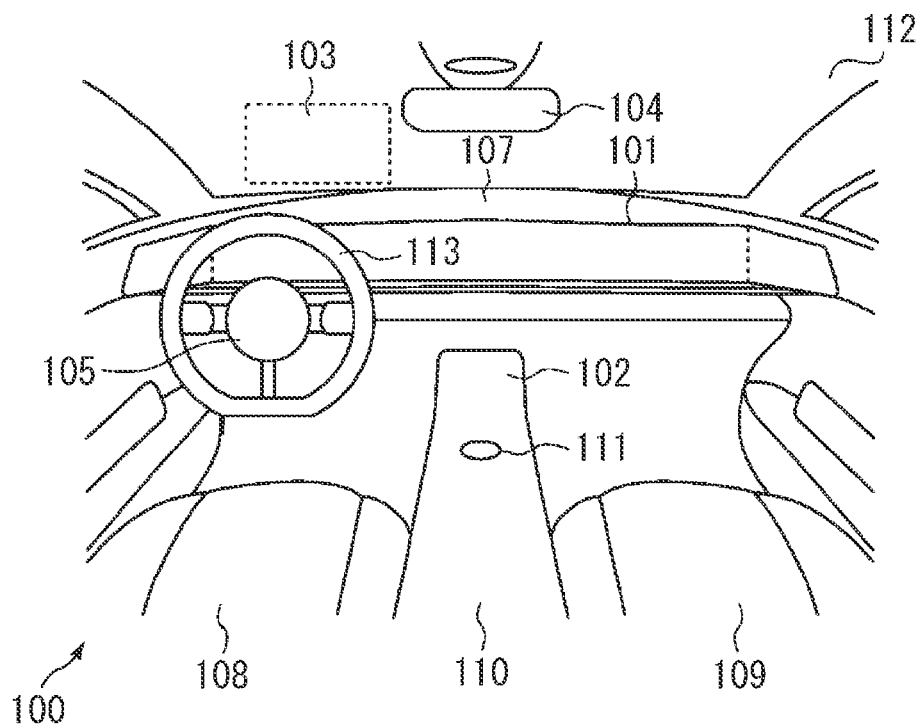
FIG. 16A is a view illustrating an internal state of a vehicle from a rear side to a front side of the vehicle.
Figure 16B:
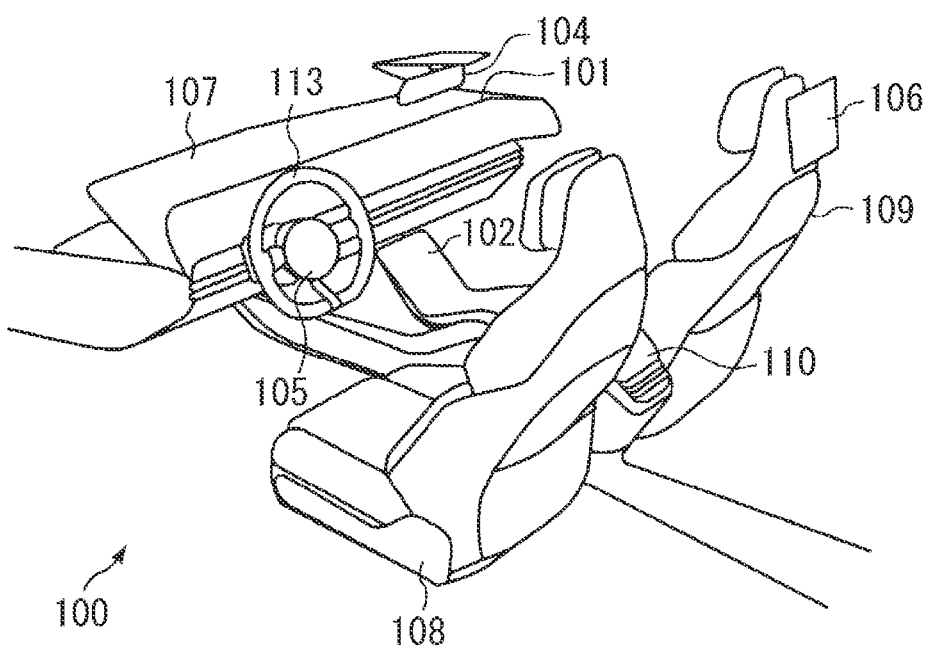
FIG. 16B is a view illustrating an internal state of the vehicle from an oblique rear to an oblique front of the vehicle.

The imaging device 1 and the electronic device 2 according to the present disclosure can be used for various purposes. FIGS. 16A and 16B are diagrams illustrating an internal configuration of a vehicle 100 which is a first application example of the electronic device 2 including the imaging device 1 according to the present disclosure. FIG. 16A is a view illustrating an internal state of the vehicle 100 from a rear side to a front side of the vehicle 100, and FIG. 16B is a view illustrating an internal state of the vehicle 100 from an oblique rear side to an oblique front side of the vehicle 100.

The vehicle 100 of FIGS. 16A and 16B has a center display 101, a console display 102, a head-up display 103, a digital rear mirror 104, a steering wheel display 105, and a rear entertainment display 106.

The center display 101 is disposed on a dashboard 107 at a position facing the driver's seat 108 and the passenger seat 109. FIG. 16 illustrates an example of the center display 101 having a horizontally long shape extending from the driver's seat 108 side to the passenger seat 109 side, but the screen size and the arrangement location of the center display 101 are arbitrary. The center display 101 can display information detected by various sensors 5. As a specific example, the center display 101 can display a captured image captured by the image sensor, a distance image to an obstacle in front of or on a side of the vehicle measured by a ToF sensor 5, a passenger's body temperature detected by the infrared sensor 5, and the like. The center display 101 can be used to display, for example, at least one of safety-related information, operation-related information, a life log, health-related information, authentication/identification-related information, or entertainment-related information.

The safety-related information is information such as doze detection, looking-away detection, mischief detection of a child riding together, presence or absence of wearing of a seat belt, and detection of leaving of an occupant, and is, for example, information detected by the sensor 5 disposed to overlap the back surface side of the center display 101. The operation-related information detects a gesture related to the operation of the occupant using the sensor 5. The detected gesture may include operation of various equipment in the vehicle 100. For example, operations of air conditioning equipment, a navigation device, an AV device, a lighting device, and the like are detected. The life log includes a life log of all the occupants. For example, the life log includes an action record of each occupant in the vehicle. By acquiring and storing the life log, it is possible to confirm the state of the occupant at the time of the accident. The health-related information detects the body temperature of the occupant using a temperature sensor 5, and estimates the health state of the occupant on the basis of the detected body temperature. Alternatively, the face of the occupant may be imaged using an image sensor, and the health state of the occupant may be estimated from the imaged facial expression. Furthermore, a conversation may be made with the occupant in an automatic voice, and the health state of the occupant may be estimated on the basis of the answer content of the occupant. The authentication/identification-related information includes a keyless entry function of performing face authentication using the sensor 5, a function of automatically adjusting a seat height and a position in face identification, and the like. The entertainment-related information includes a function of detecting operation information of the AV device by the occupant using the sensor 5, a function of recognizing the face of the occupant by the sensor 5 and providing content suitable for the occupant by the AV device, and the like.

The console display 102 can be used to display the life log information, for example. The console display 102 is disposed near a shift lever 111 of a center console 110 between the driver's seat 108 and the passenger seat 109. The console display 102 can also display information detected by the various sensors 5. In addition, the console display 102 may display an image of the periphery of the vehicle imaged by the image sensor, or may display a distance image to an obstacle in The periphery of the vehicle.

The head-up display 103 is virtually displayed behind a windshield 112 in front of the driver's seat 108. The head-up display 103 can be used to display, for example, at least one of safety-related information, operation-related information, a life log, health-related information, authentication/identification-related information, or entertainment-related information. Since the head-up display 103 is virtually disposed in front of the driver's seat 108 in many cases, it is suitable for displaying information directly related to the operation of the vehicle 100 such as the speed of the vehicle 100 and the remaining amount of fuel (battery).

The digital rear mirror 104 can not only display the rear of the vehicle 100 but also display the state of the occupant in the rear seat, and thus can be used to display the life log information, for example, by disposing the sensor 5 to be superimposed on the back surface side of the digital rear mirror 104.

The steering wheel display 105 is disposed near the center of a steering wheel 113 of the vehicle 100. The steering wheel display 105 can be used to display, for example, at least one of safety-related information, operation-related information, a life log, health-related information, authentication/identification-related information, or entertainment-related information. In particular, since the steering wheel display 105 is close to the driver's hand, it is suitable for displaying life log information such as the body temperature of the driver, or for displaying information related to the operation of an AV device, air conditioning equipment, or the like.

The rear entertainment display 106 is attached to the back side of the driver's seat 108 and the passenger seat 109, and is for viewing by an occupant in the rear seat. The rear entertainment display 106 can be used to display, for example, at least one of safety-related information, operation-related information, a life log, health-related information, authentication/identification-related information, or entertainment-related information. In particular, since the rear entertainment display 106 is in front of the occupant in the rear seat, information related to the occupant in the rear seat is displayed. For example, information regarding the operation of the AV device or air conditioning equipment may be displayed, or a result of measuring the body temperature or the like of the occupant in the rear seat by the temperature sensor 5 may be displayed.

As described above, by disposing the sensor 5 on the back surface side of the display unit 3 in an overlapping manner, it is possible to measure the distance to an object existing in the surroundings. Optical distance measurement methods are roughly classified into a passive type and an active type. In the passive type, distance measurement is performed by receiving light from an object without projecting light from the sensor 5 to the object. The passive type includes a lens focus method, a stereo method, a monocular vision method, and the like. In the active type, light is projected onto an object, and reflected light from the object is received by the sensor 5 to measure a distance. The active type includes an optical radar method, an active stereo method, an illuminance difference stereo method, a moire topography method, an interference method, and the like. The imaging device 1 according to the present disclosure is applicable to any of these types of distance measurement. By using the sensor 5 disposed to overlap the back surface side of the display unit 3 according to the present disclosure, the above-described passive or active distance measurement can be performed.

Second Application Example

The imaging device 1 according to the present disclosure is applicable not only to various displays used in vehicles but also to displays mounted on various electronic devices 2.

Figure 17A:
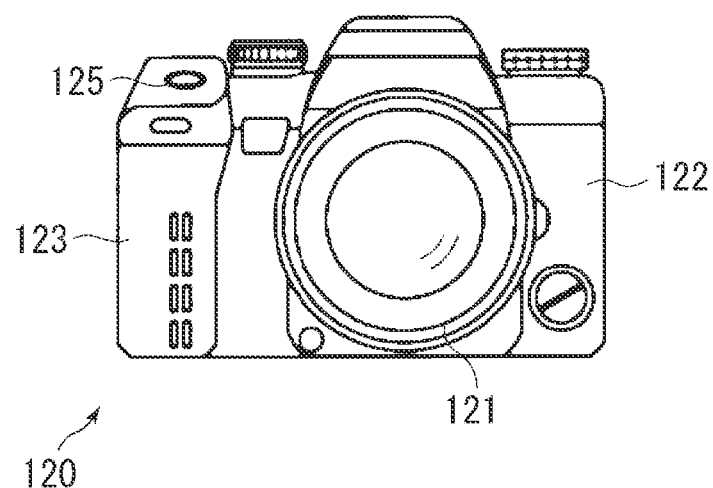
FIG. 17A is a front view of a digital camera as a second application example of the electronic device.
Figure 17B:
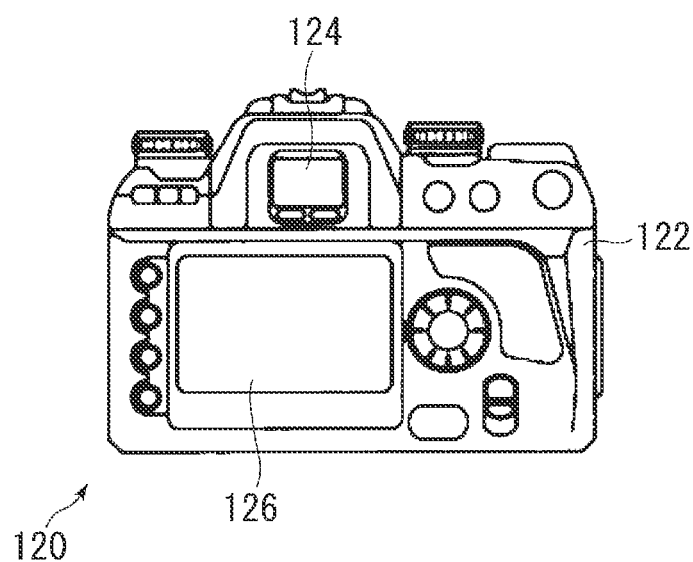
FIG. 17B is a rear view of the digital camera.

FIG. 17A is a front view of a digital camera 120 as a second application example of the electronic device 2, and FIG. 17B is a rear view of the digital camera 120. The digital camera 120 in FIGS. 17A and 17B illustrates an example of a single-lens reflex camera in which a lens 121 is replaceable, but is also applicable to a camera in which the lens 121 is not replaceable.

In the camera of FIGS. 17A and 17B, when the photographer looks into an electronic viewfinder 124 to determine the composition while holding a grip 123 of a camera body 122, and presses a shutter 125 while adjusting the focus, captured data is stored in the memory in the camera. As illustrated in FIG. 17B, a monitor screen 126 that displays captured data and the like, a live image, and the like, and an electronic viewfinder 124 are provided on the back side of the camera. In addition, there is also a case where a sub screen for displaying setting information such as a shutter speed and an exposure value is provided on the upper surface of the camera.

By disposing the sensor 5 so as to overlap the back surface side of the monitor screen 126, the electronic viewfinder 124, the sub screen, and the like used for the camera, the camera can be used as the imaging device 1 according to the present disclosure.

Third Application Example

The imaging device 1 and the electronic device 2 according to the present disclosure are also applicable to a head mounted display (hereinafter, referred to as an HMD). The HMD can be used for virtual reality (VR), augmented reality (AR), mixed reality (MR), substitutional reality (SR), or the like.

Figure 18A:
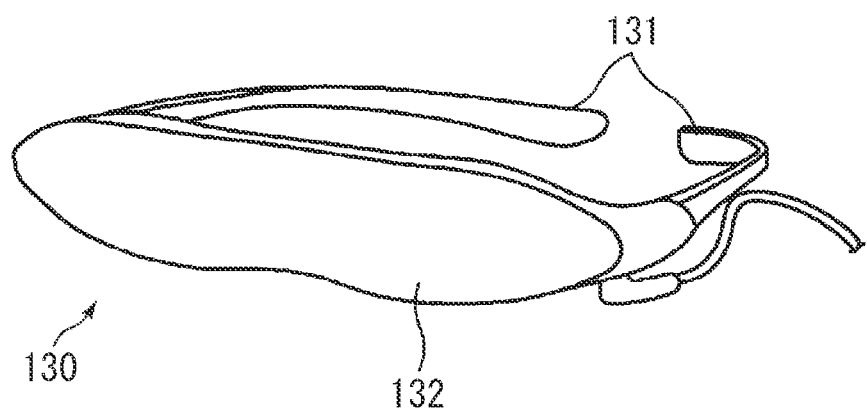
FIG. 18A is an external view of an HMD which is a third application example of the electronic device.

FIG. 18A is an external view of an HMD 130 which is a third application example of the electronic device 2. The HMD 130 of FIG. 18A has an attachment member 131 for attachment so as to cover human eyes. The attachment member 131 is hooked and fixed to a human ear, for example. A display device 132 is provided inside the HMD 130, and a wearer of the HMD 130 can visually recognize a stereoscopic image and the like with the display device 132. The HMD 130 includes, for example, a wireless communication function, an acceleration sensor, and the like, and can switch a stereoscopic image and the like displayed on the display device 132 in accordance with the posture, gesture, and the like of the wearer.

Furthermore, a camera may be provided in the HMD 130 to capture an image around the wearer, and an image obtained by combining the captured image of the camera and the image generated by the computer may be displayed on the display device 132. For example, a camera is disposed to be superimposed on the back surface side of the display device 132 visually recognized by the wearer of the HMD 130, the periphery of the eye of the wearer is captured by the camera, and the captured image is displayed on another display provided on the outer surface of the HMD 130, so that a person around the wearer can grasp the expression of the face of the wearer and the motion of the eye in real time.

Figure 18B:
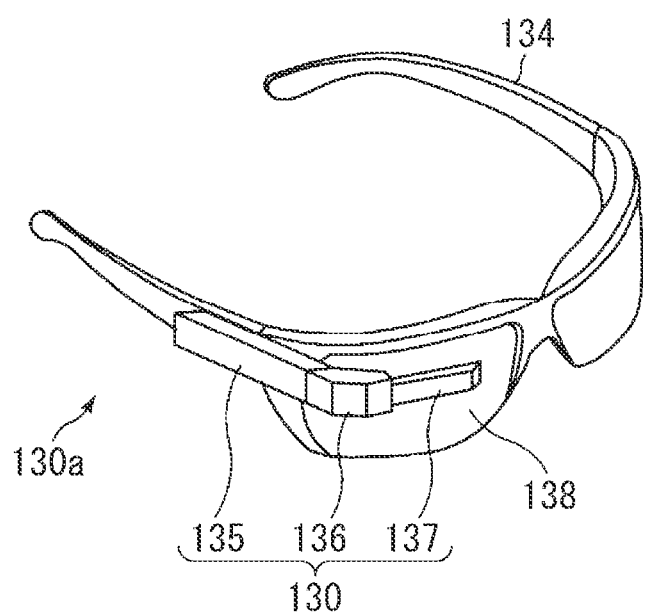
FIG. 18B is an external view of a smart glass.

Note that various types of the HMD 130 are conceivable. For example, as illustrated in FIG. 18B, the imaging device 1 and the electronic device 2 according to the present disclosure can also be applied to a smart glass 130a that displays various types of information on eyeglasses 134. The smart glass 130a in FIG. 18B includes a main body 135, an arm 136, and a lens barrel portion 137. The main body 135 is connected to the arm 136. The main body 135 is detachable from the eyeglasses 134. The main body 135 incorporates a control board and a display unit for controlling the operation of the smart glass 130a. The main body 135 and the lens barrel are connected to each other via the arm 136. The lens barrel portion 137 emits image light emitted from the main body 135 through the arm 136 toward a lens 138 of the eyeglasses 134. This image light enters human eyes through the lens 138. The wearer of the smart glass 130a in FIG. 18B can visually recognize not only the surrounding situation but also various pieces of information emitted from the lens barrel portion 137, similarly to normal eyeglasses.

Fourth Application Example

The imaging device 1 and the electronic device 2 according to the present disclosure are also applicable to a television device (hereinafter, TV). Recent TVs tend to make the frame as small as possible from the viewpoint of downsizing and design property. Therefore, in a case where a camera for capturing an image of a viewer is provided on a TV, it is desirable to dispose the camera so as to overlap the back surface side of a display panel 2 of the TV.

Figure 19:
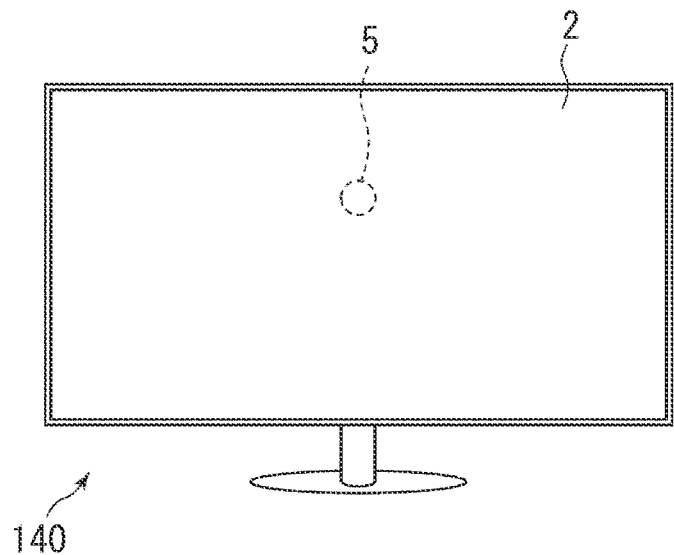
FIG. 19 is an external view of a TV which is a fourth application example of the electronic device.

FIG. 19 is an external view of a TV 140 which is a fourth application example of the electronic device 2. In the TV 140 of FIG. 19, the frame is minimized, and almost the entire area on the front side is a display area. The TV 140 incorporates a sensor 5 such as a camera for capturing an image of a viewer. The sensor 5 in FIG. 19 is disposed on a back side of a part (for example, a broken line part) in the display panel 2. The sensor 5 may be an image sensor module, or various sensors such as a sensor for face authentication, a sensor for distance measurement, and a temperature sensor can be applied, and a plurality of types of sensors may be arranged on the back surface side of the display panel 2 of the TV 140.

As described above, according to the imaging device and the electronic device 2 of the present disclosure, since an image sensor module 9 can be disposed to overlap the back surface side of the display panel 2, it is not necessary to dispose a camera or the like in the frame, the TV 140 can be downsized, and there is no possible that the design is impaired by the frame.

Fifth Application Example

Figure 20:
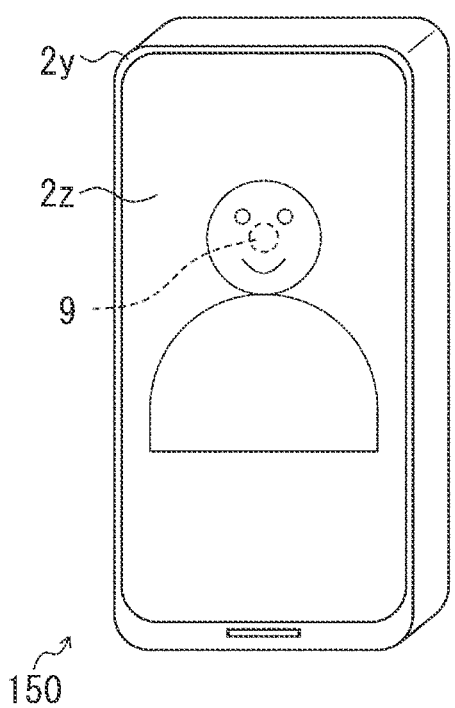
FIG. 20 is an external view of a smartphone which is a fifth application example of the electronic device.

The imaging device 1 and the electronic device 2 according to the present disclosure are also applicable to a smartphone and a mobile phone. FIG. 20 is an external view of a smartphone 150 which is a fifth application example of the electronic device 2. In the example of FIG. 20, a display surface 2z spreads close to the outer size of the electronic device 2, and the width of a bezel 2y around the display surface 2z is set to several mm or less. Normally, a front camera is often mounted on the bezel 2y, but in FIG. 20, as indicated by a broken line, the image sensor module 9 functioning as a front camera is disposed on the back surface side of the substantially central portion of the display surface 2z, for example. By providing the front camera on the back surface side of the display surface 2z in this manner, it is not necessary to dispose the front camera in the bezel 2y, and the width of the bezel 2y can be narrowed.

Note that, the present technology can also adopt the following configurations.

(1) An electronic device including:
a display unit;
a first imaging unit that is disposed on a side opposite to a display surface of the display unit and is capable of capturing an image of light in an infrared light wavelength band that has passed through the display unit;
a second imaging unit that is disposed on a side opposite to the display surface of the display unit and is capable of capturing an image of light in a visible light wavelength band that has passed through the display unit; and
a correction unit that corrects image data imaged by the second imaging unit on the basis of image data imaged by the first imaging unit.

(2) The electronic device according to (1), in which the correction unit corrects sensitivity of the image data imaged by the second imaging unit on the basis of the image data imaged by the first imaging unit.

(3) The electronic device according to (2), further including a learning unit that learns a correlation between sensitivity of the image data imaged by the first imaging unit and sensitivity of the image data imaged by the second imaging unit, in which
the correction unit corrects the sensitivity of the image data imaged by the second imaging unit on the basis of the image data imaged by the first imaging unit with reference to a learning result in the learning unit.

(4) The electronic device according to (1), in which the correction unit corrects resolution of the image data imaged by the second imaging unit on the basis of the image data imaged by the first imaging unit.

(5) The electronic device according to (4), further including a learning unit that learns a correlation between resolution of the image data imaged by the first imaging unit and the resolution of the image data imaged by the second imaging unit, in which
the correction unit corrects the resolution of the image data imaged by the second imaging unit on the basis of the image data imaged by the first imaging unit with reference to a learning result in the learning unit.

(6) The electronic device according to (1), in which the correction unit corrects at least one of a flare component or a diffracted light component included in the image data imaged by the second imaging unit on the basis of the image data imaged by the first imaging unit.

(7) The electronic device according to (6), further including
a learning unit that learns a correlation between at least one of a flare component or a diffracted light component included in the image data imaged by the first imaging unit and at least one of a flare component or a diffracted light component included in the image data imaged by the second imaging unit, in which the correction unit corrects at least one of the flare component or the diffracted light component included in the image data imaged by the second imaging unit on a basis of the image data imaged by the first imaging unit with reference to a learning result in the learning unit.

(8) The electronic device according to (7), further including:
a reference determination unit that determines whether or not at least one of sensitivity, resolution, a flare component, or a diffracted light component of the image data imaged by the second imaging unit satisfies a predetermined first reference;
an imaging start instruction unit that starts imaging by the first imaging unit when the reference determination unit determines that the first reference is not satisfied; and
a correction procedure determination unit that determines whether or not to perform correction by the correction unit and a type of image data to be a reference of correction when correction by the correction unit is performed on the basis of a result of comparing at least one of sensitivity, resolution, a flare component, or a diffracted light component between the image data imaged by the first imaging unit and the image data imaged by the second imaging unit.

(9) The electronic device according to (8), in which when the type of image data to be a reference of correction is determined by the correction procedure determination unit, the learning unit learns a correlation between at least one of sensitivity, resolution, a flare component, or a diffracted light component of the determined image data and at least one of the sensitivity, the resolution, the flare component, and the diffracted light component of the image data imaged by the second imaging unit.

(10) The electronic device according to any one of (7) to (9), further including:
a sensor that detects at least one of a shape or a color of an object;
a reliability estimation unit that estimates reliability of learning by the learning unit;
an object identification determination unit that determines whether or not the object can be identified on the basis of detection data of the sensor in a case where the reliability estimated by the reliability estimation unit is equal to or less than a predetermined second reference; and
a color specification determination unit that determines whether or not the color of the object identified by the sensor can be specified in a case where the object identification determination unit determines that the object can be identified, and
in a case where the color specification determination unit determines that the color of the object can be specified, the correction unit corrects the image data imaged by the second imaging unit so as to approach the specified color.

(11) The electronic device according to any one of (1) to (10), in which the correction unit sets a noise removal degree of a pixel region having a luminance change equal to or less than a predetermined reference value in the image data imaged by the second imaging unit to be higher than a noise removal degree of a pixel region having a luminance change larger than the reference value in the image data.

(12) The electronic device according to any one of (1) to (11), further including:
a light emitting unit that emits light in an infrared light wavelength band; and
a light emission control unit that controls a light emission timing of the light emitting unit such that a subject is illuminated with light emitted by the light emitting unit when image data is imaged by the first imaging unit.

(13) The electronic device according to (12), in which
the light emitting unit includes a plurality of light sources that emits light in light emission wavelength bands different from each other in the infrared light wavelength band,
the light emission control unit sequentially switches and controls light emission by the plurality of light sources while the first imaging unit performs imaging,
the first imaging unit outputs a plurality of pieces of image data imaged in emission light wavelength bands different from each other, and
the correction unit corrects the image data imaged by the second imaging unit on the basis of the plurality of pieces of image data.

(14) The electronic device according to (12) or (13), in which the light emitting unit is disposed on a display surface side of the display unit.

(15) The electronic device according to any one of (1) to (14), in which at least one of the first imaging unit or the second imaging unit includes a pixel that captures an image of light in an infrared light wavelength band and a pixel that captures an image of light in a visible light wavelength band.

(16) The electronic device according to (15), in which the first imaging unit has sensitivity to light of 550 nm or more.

(17) The electronic device according to any one of (1) to (16), in which the correction unit increases the degree of correction toward a shorter wavelength side with respect to the image data imaged by the second imaging unit.

(18) The electronic device according to any one of (1) to (17), in which the first imaging unit includes a photoelectric conversion unit arranged to be longer in a normal direction of a light incident surface than the second imaging unit.

(19) The electronic device according to any one of (1) to (18), in which
an area of the first imaging unit in a light incident surface direction per pixel is larger than an area of the second imaging unit in a light incident surface direction per pixel, and
an area of all the pixels of the first imaging unit in the light incident surface direction is smaller than an area of all the pixels of the second imaging unit in the light incident surface direction.

(20) An imaging device including: a first imaging unit that is disposed on a side opposite to a display surface of a display unit and is capable of capturing an image of light in an infrared light wavelength band;
a second imaging unit that is disposed on a side opposite to a display surface of the display unit and is capable of capturing an image of light in a visible light wavelength band; and
a correction unit that corrects image data imaged by the second imaging unit on the basis of image data imaged by the first imaging unit.

(21) An imaging device including:
a first imaging unit capable of capturing an image of light in an infrared light wavelength band;
a second imaging unit capable of capturing an image of light is a visible light wavelength band; and
a correction unit that corrects image data imaged by the second imaging unit on the basis of image data imaged by the first imaging unit.

Aspects of the present disclosure are not limited to the above-described embodiments, but include various modifications that can be conceived by a person skilled in the art, and the effects of the present disclosure are not limited to the above-described contents. That is, various additions, modifications, and partial deletions can be made without departing from the conceptual idea and gist of the present disclosure derived from the contents defined in the claims and equivalents thereof.

REFERENCE SIGNS LIST

1 Imaging device
2, 2a, 2b Electronic device
3 Display unit
3a Display surface
3b Bezel
4 Camera module
5 Camera module
6 First imaging unit
7 Second imaging unit
8 First optical system
9 Second optical system
11 Semiconductor substrate
12a First photoelectric conversion unit
12b Second photoelectric conversion unit
13 Element isolation layer
14 Flattening layer
15a On-chip lens
15b On-chip lens
16 Color filter layer
17 Read circuit
21 Application processor
22 video signal generation unit
23 A/C conversion unit
24 Display control unit
31 First A/D conversion unit
32 Second A/D conversion unit 33 Signal processing unit
100 Vehicle
101 Center display
102 Console display
103 Head-up display
104 Digital rear mirror
105 Steering wheel display
106 Rear entertainment display
107 Dashboard
108 Driver's seat
109 Passenger seat
110 Center console
111 Shift lever
112 Windshield
113 Steering wheel
120 Digital camera
121 Lens
122 Camera body
123 Grip
124 Electronic viewfinder
125 Shutter
126 Monitor screen
130 Smart glass
131 Mounting member
132 Display device
134 Glasses
135 Main body
136 Arm
137 Lens barrel portion
136 Lens
150 Smartphone

The invention claimed is:

1. An electronic device comprising:
a display;
a first imaging circuit that is disposed on a side opposite to a display surface of the display and is configured to capture an image of light in an infrared light wavelength band that has passed through the display;
a second imaging circuit that is disposed on a side opposite to the display surface of the display and is configured to capture an image of light in a visible light wavelength band that has passed through the display;
an electronic processor configured to
correct image data imaged by the second imaging circuit on a basis of image data imaged by the first imaging circuit, and
set a noise removal degree of a pixel region having a luminance change equal to or less than a predetermined reference value in the image data imaged by the second imaging circuit to be higher than a noise removal degree of a pixel region having a luminance change larger than the reference value in the image data.

2. The electronic device according to claim 1, wherein the electronic processor corrects sensitivity of the image data imaged by the second imaging circuit on a basis of the image data imaged by the first imaging circuit.

3. The electronic device according to claim 2, wherein the electronic processor learns a correlation between sensitivity of the image data imaged by the first imaging circuit and sensitivity of the image data imaged by the second imaging circuit, wherein
the electronic processor corrects the sensitivity of the image data imaged by the second imaging circuit on a basis of the image data imaged by the first imaging circuit with reference to a learning result in the electronic processor.

4. The electronic device according to claim 1, wherein the electronic processor corrects resolution of the image data imaged by the second imaging circuit on a basis of the image data imaged by the first imaging circuit.

5. The electronic device according to claim 4, wherein the electronic processor learns a correlation between resolution of the image data imaged by the first imaging circuit and the resolution of the image data imaged by the second imaging circuit, wherein
the electronic processor corrects the resolution of the image data imaged by the second imaging circuit on a basis of the image data imaged by the first imaging circuit with reference to a learning result of the electronic processor.

6. The electronic device according to claim 1, wherein the electronic processor corrects at least one of a flare component or a diffracted light component included in the image data imaged by the second imaging circuit on a basis of the image data imaged by the first imaging circuit.

7. The electronic device according to claim 6, wherein
the electronic processor learns a correlation between at least one of a flare component or a diffracted light component included in the image data imaged by the first imaging circuit and at least one of a flare component or a diffracted light component included in the image data imaged by the second imaging circuit, and
the electronic processor corrects at least one of the flare component or the diffracted light component included in the image data imaged by the second imaging circuit on a basis of the image data imaged by the first imaging circuit with reference to a learning result of the electronic processor.

8. The electronic device according to claim 7, wherein the electronic processor
determines whether or not at least one of sensitivity, resolution, a flare component, or a diffracted light component of the image data imaged by the second imaging circuit satisfies a predetermined first reference;
starts imaging by the first imaging circuit in response to determining that the first reference is not satisfied; and
determines whether to perform correction and determines a type of image data to be a reference of correction when correction by the electronic processor is performed on a basis of a result of comparing at least one of sensitivity, resolution, a flare component, or a diffracted light component between the image data imaged by the first imaging circuit and the image data imaged by the second imaging circuit.

9. The electronic device according to claim 8, wherein when the type of image data to be a reference of correction is determined by the electronic processor, the electronic processor learns a correlation between at least one of sensitivity, resolution, a flare component, or a diffracted light component of the determined image data and at least one of the sensitivity, the resolution, the flare component, and the diffracted light component of the image data imaged by the second imaging circuit.

10. The electronic device according to claim 7, further comprising:
a sensor that detects at least one of a shape or a color of an object;
wherein the electronic processor estimates reliability of learning by the electronic processor,
determines whether or not the object can be identified on a basis of detection data of the sensor in a case where the reliability is equal to or less than a predetermined second reference;

determines whether the color of the object identified by the sensor can be specified in a case where the object can be identified, and in a case where the color of the object can be specified, corrects the image data imaged by the second imaging circuit so as to approach the specified color.

11. The electronic device according to claim 1, further comprising:

a light emitting circuit that emits light in an infrared light wavelength band; and a light emission controller that controls a light emission timing of the light emitting circuit such that a subject is illuminated with light emitted by the light emitting circuit when image data is imaged by the first imaging circuit.

12. The electronic device according to claim 11, wherein the light emitting circuit includes a plurality of light sources that emits light in light emission wavelength bands different from each other in the infrared light wavelength band, the light emission controller sequentially switches and controls light emission by the plurality of light sources while the first imaging circuit performs imaging, the first imaging circuit outputs a plurality of pieces of image data imaged in emission light wavelength bands different from each other, and the electronic processor corrects the image data imaged by the second imaging circuit on a basis of the plurality of pieces of image data.

13. The electronic device according to claim 11, wherein the light emitting circuit is disposed on a display surface side of the display.

14. The electronic device according to claim 1, wherein at least one of the first imaging circuit and the second imaging circuit includes a pixel that captures an image of light in an infrared light wavelength band and a pixel that captures an image of light in a visible light wavelength band.

15. The electronic device according to claim 14, wherein the first imaging circuit has sensitivity to light of 550 nm or more.

16. The electronic device according to claim 1, wherein the electronic processor increases a degree of correction toward a shorter wavelength side with respect to the image data imaged by the second imaging circuit.

17. The electronic device according to claim 1, wherein the first imaging circuit includes a photoelectric conversion circuit arranged to be longer in a normal direction of a light incident surface than the second imaging circuit.

18. The electronic device according to claim 1, wherein an area of the first imaging circuit in a light incident surface direction per pixel is larger than an area of the second imaging circuit in a light incident surface direction per pixel, and an area of all the pixels of the first imaging circuit in the light incident surface direction is smaller than an area of all the pixels of the second imaging circuit in the light incident surface direction.

19. An imaging device comprising:

a first imaging circuit that is disposed on a side opposite to a display surface of a display unit and is capable of capturing an image of light in an infrared light wavelength band;

a second imaging circuit that is disposed on a side opposite to a display surface of the display and is capable of capturing an image of light in a visible light wavelength band; and an electronic processor configured to learn a correlation between at least one of a flare component or a diffracted light component included in image data imaged by the first imaging circuit and at least one of a flare component or a diffracted light component included in the image data imaged by the second imaging circuit, determine whether at least one of sensitivity, resolution, a flare component, or a diffracted light component of the image data imaged by the second imaging circuit satisfies a predetermined first reference, start imaging by the first imaging circuit in response to determining that the first reference is not satisfied, determine whether to perform correction and determine a type of image data to be a reference of correction on a basis of a result of comparing at least one of sensitivity, resolution, a flare component, or a diffracted light component between the image data imaged by the first imaging circuit and the image data imaged by the second imaging circuit, and correct at least one of the flare component or the diffracted light component included in the image data imaged by the second imaging circuit on a basis of the image data imaged by the first imaging circuit with reference to a learning result of the electronic processor.

20. An imaging device comprising:

a display;

a first imaging circuit that is disposed on a side opposite to a display surface of the display and is configured to capture an image of light in an infrared light wavelength band;

a second imaging circuit disposed on a side opposite to the display surface of the display and is configured to capture an image of light in a visible light wavelength band;

an electronic processor configured to correct image data imaged by the second imaging circuit on a basis of image data imaged by the first imaging circuit;

a light emitting circuit including a plurality of light sources that emits light in light emission wavelength bands different from each other in the infrared light wavelength band; and a light emission controller that sequentially switches and controls light emission by the plurality of light sources while the first imaging circuit performs imaging, wherein the first imaging circuit outputs a plurality of pieces of image data imaged in emission light wavelength bands different from each other, and the electronic processor corrects the image data imaged by the second imaging circuit on a basis of the plurality of pieces of image data.

* * * * *